US012103676B2

(12) United States Patent
Jenett et al.

(10) Patent No.: US 12,103,676 B2
(45) Date of Patent: Oct. 1, 2024

(54) ELASTIC SHAPE MORPHING OF ULTRA-LIGHT STRUCTURES BY PROGRAMMABLE ASSEMBLY

(71) Applicant: United States of America as Represented by the Administrator of NASA, Washington, DC (US)

(72) Inventors: Benjamin Eric Jenett, Cambridge, MA (US); Neil Gershenfeld, Cambridge, MA (US); Sean Swei, Moffett Field, CA (US); Nicholas Cramer, Moffett Field, CA (US); Kenneth Cheung, Moffett Field, CA (US)

(73) Assignee: United States of America as represented by the Administrator of NASA

(*) Notice: Subject to any disclaimer, the term of this patent is extended or adjusted under 35 U.S.C. 154(b) by 554 days.

(21) Appl. No.: 16/812,502

(22) Filed: Mar. 9, 2020

(65) Prior Publication Data
US 2020/0283121 A1      Sep. 10, 2020

Related U.S. Application Data

(60) Provisional application No. 62/816,078, filed on Mar. 9, 2019.

(51) Int. Cl.
*B64C 3/48*      (2006.01)
*B64C 3/26*      (2006.01)
(Continued)

(52) U.S. Cl.
CPC ............... *B64C 3/48* (2013.01); *B64C 3/26* (2013.01); *B64C 3/52* (2013.01); *C08K 7/14* (2013.01);
(Continued)

(58) Field of Classification Search
CPC ........ B64C 2003/445; B64C 2003/543; B64C 3/48; B64C 3/52; B64C 3/22; B64C 3/26
See application file for complete search history.

(56) References Cited

U.S. PATENT DOCUMENTS 1,567,531 A * 12/1925 Magni ................. B64C 3/48
                                                   244/215
5,332,178 A *  7/1994 Williams ............ B29C 70/446
                                                   244/133
(Continued)

FOREIGN PATENT DOCUMENTS

WO    WO-2014025944 A2 *  2/2014  ............. A63H 33/00

OTHER PUBLICATIONS

"Interface." Merriam-Webster.com Dictionary, Merriam-Webster, https://www.merriam-webster.com/dictionary/interface. Accessed Nov. 2, 2023. (Year: 1882).*

(Continued)

*Primary Examiner* — Richard Green
*Assistant Examiner* — Steven J Shur
(74) *Attorney, Agent, or Firm* — Rhys W. Cheung; Robert M. Padilla; Trenton J. Roche

(57) ABSTRACT

A shape-morphing ultralight structure using materials that dramatically increase the efficiency of load-bearing aerostructures that includes a programmable material system applied as a large-scale, ultralight, and conformable (shape-morphing) aeroelastic structure. The use of a modular, lattice-based, ultralight material results in stiffness and density typical of an elastomer. This, combined with a building block-based manufacturing and configuration strategy, enables the rapid realization of new adaptive structures and mechanisms. The heterogeneous design with programmable anisotropy allows for enhanced elastic and global shape deformation in response to external loading, making it useful for tuned fluid-structure interaction. The present (Continued)

invention demonstrates an example application experiment using two building block types for the primary structure of a 4.27 m wingspan aircraft with spatially programed elastic shape morphing to increase aerodynamic efficiency.

20 Claims, 16 Drawing Sheets

(51) Int. Cl.
    *B64C 3/52*     (2006.01)
    *C08K 7/14*     (2006.01)
    *C08L 79/08*     (2006.01)
    *B64C 3/54*     (2006.01)

(52) U.S. Cl.
    CPC ........ *C08L 79/08* (2013.01); *B64C 2003/543* (2013.01)

(56) References Cited

U.S. PATENT DOCUMENTS

| | | | | |
|---|---|---|---|---|
| 5,681,014 | A * | 10/1997 | Palmer | B64C 3/52 244/206 |
| 6,979,050 | B2 * | 12/2005 | Browne | B62D 35/00 296/180.1 |
| 9,555,871 | B2 * | 1/2017 | Grip | B64D 29/00 |
| 9,856,013 | B2 * | 1/2018 | Paris Carballo | B64C 3/48 |
| 10,654,557 | B2 * | 5/2020 | Xi | B64C 5/14 |
| 2019/0202543 | A1 * | 7/2019 | Gatto | B64C 3/48 |

OTHER PUBLICATIONS

Nazir, Aamer, et al. A State-of-the-art Review on Types, Design, Optimization, and Additive Manufacturing of Cellular Structures. The International Journal of Advanced Manufacturing Technology/International Journal, (Year: 2019) Advanced Manufacturing Technology, vol. 104, No. 9-12, Jul. 2019, pp. 3489-3510. https://doi.org/10.1007/s00170-019-04085-3 (Year: 2019).*
Senatore et al., "Exploring the application domain of adaptive structures," Engineering Structures, vol. 167, 2018, pp. 608-628.
Joshi et al., "Comparison of morphing wing stategies based upon aircraft performance impacts", 45th AIAA/ASMEIASCE/AHS/ASC Structures, Structural Dynamics & Materials Conference, 2004, 7 pages.
Barbarino et al., "A Review of Morphing Aircraft," Journal of Intelligent Material Systems and Structures, vol. 22, Issue 9, 2011, pp. 42.
Weisshaar, Terrence A., "Morphing Aircraft Technology—New Shapes for Aircraft Design", Tech. rep. Purdue Univ Lafayette IN., 2006, pp. 20.
Straub et al., "Development of a piezoelectric actuator for trailing edge flap control of full scale rotor blades," Smart Materials and Structures, 2001, pp. 25. [Abstract Only].
Monner Hans Peter, "Realization of an optimized wing camber by using shape-variable flap structures, Achievement of optimized wing arching through the use of shape-variable flap structures", Aerospace Science and Technology vol. 5, Issue 7, Oct. 2001, pp. 445-455. [Abstract Only].
Vos et al., "Mechanics of pressure-adaptive honeycomb and its application to wing morphing," Smart Materials and Structures, vol. 20, No. 9, 2011, pp. 203-207. [Abstract Only].
Sanders et al., "Aerodynamic and Aeroelastic Characteristics of Wings with Conformal Control Surfaces for Morphing Aircraft", Journal of Aircraft, vol. 40, Issue 1, May 22, 2012, pp. 94-99. [Abstract Only].
Kudva et al., "Overview of the DARPA/AFRL/NASA Smart Wing program", Jul. 9, 1999, Journal of intelligent material systems and structures 15 pp. 261-267. [Abstract Only].

Kudva et al., "Adaptive structures: engineering applications", John Wiley & Sons, Technology & Engineering, 2008, 314 pages. [Abstract Only].
Jun JW, Silverio M, Llubia JA, Markopoulou A, Dubor A et al. 2017.
Yokozeki et al., "Mechanical properties of corrugated composites for candidate materials of flexible wing structures," Composites Part A: applied science and manufacturing, vol. 37, 2006, pp. 1578-1586. [Abstract Only].
Kota et al., "Design and application of compliant mechanisms for morphing aircraft structures Smart Structures", Materials 2003: Industrial and Commercial Applications of Smart Structures Technologies vol. 5054, Society of Photo-Optical Instrumentation Engineers, 2003, pp. 24-34. [Abstract Only].
Chen et al., "Structural design and analysis of morphing skin embedded with pneumatic muscle fibers", Smart Materials and Structures, vol. 20, No. 8, 2011, p. 1. [Abstract Only].
Majji et al., "Design of a morphing wing: modeling and experiments," Session: AFM-2: Aircraft Dynamics, 2007, p. 6310. [Abstract Only].
Neal et al., "Design and Wind-Tunnel Analysis of a Fully Adaptive Aircraft Configuration," Session: ASC-4: Morphing Aircraft Structures, 45th AIAA/ASME/ASCE/AHS/ASC Structures, Structural Dynamics & Materials Conference, 2004, p. 1727. [Abstract Only].
Cheung et al., "Reversibly assembled cellular composite materials", Science, Sep. 13, 2013, 341(6151), pp. 1219-1221. [Abstract Only].
Schaedler et al., "Architected cellular materials," Annual Review of Materials Research, vol. 46, pp. 187-210, 2016. [Abstract Only].
Bertoldi et al., "Flexible mechanical metamaterials," Nature Reviews Materials vol. 2, Article No. 17066 (2017). [Abstract Only].
Zheng et al., "Multiscale metallic metamaterials," Nat Mater. Oct. 2016, 15(10), pp. 1100-1106. [Abstract Only].
Gregg et al., "Ultra-Light and Scalable Composite Lattice Materials", Advanced Engineering Materials, vol. 20, Issue 9, Sep. 2018 Cycle, 2007, p. 1. [Abstract Only].
Jenett et al., "Digital Morphing Wing: Active Wing Shaping Concept Using Composite Lattice-Based Cellular Structures," Soft Robot, Mar. 1, 2017, 2017; 4(1): pp. 33-48.
Coulais et al., "Combinatorial design of textured mechanical metamaterials," Nature, Jul. 28, 2016;535(7613), pp. 529-532. [Abstract Only].
Florijn et al., "Programmable mechanical metamaterials," Phys Rev Lett, Oct. 24, 2014, 113(17), pp. 175503.
Frenzel et al., "Three-dimensional mechanical metamaterials with a twist", Science, Nov. 24, 2017, 358(6366), pp. 1072-1074. [Abstract Only].
Gibson, L. J., "Cellular Solids," Published online by Cambridge University Press, Jan. 31, 2011, pp. 5.
Liebeck, "Design of the Blended Wing Body Subsonic Transport," Electronics Letters, vol. 41, Issue 1, 2012, pp. 3. [Abstract Only].
Voskuiji et al., "Controllability of Blended Wing Body Aircraft," 26 International Congress of the Aeronautical Sciences, 2008, pp. 11.
Paranjape et al., "Flight mechanics of a tailless articulated wing aircraft," Bioinspiration & Biomimetics, vol. 6, No. 2, 2011, pp. 4. [Abstract Only].
Cramer et al., "Modeling of Tunable Elastic Ultralight Aircraft," Smart materials and structures, 2019, pp. 4. [Abstract Only].
Cramer et al., "Design approximation and proof test methods for a cellular material structure", Cellular Material Structure, AIAA Scitech 2019 Forum, 2019, p. 1. [Abstract Only].
Ashby, "The properties of foams and lattices," Philos Trans A Math Phys Eng Sci., Jan. 15, 2006;364(1838), pp. 15-30 [Abstract Only].
Von et al., 1950, Mechanical Engineering, 72, pp. 775-781.
Jones J, "Development of a Very Flexible Testbed Aircraft for the Validation of Nonlinear Aeroelastic Codes," Ph.D. thesis University of Michigan, pp. 3, 2017.
Livne et al., "Design, construction, and tests of an aeroelastic wind tunnel model of a variable camber continuous trailing edge flap (vcctef) concept wing", 32nd A/AA Applied Aerodynamics Conference, p. 2442. [Abstract Only].
Britt et al., "Wind Tunnel Test of a Very Flexible Aircraft Wing," 53rd AIAA/ASMEIASCE/AHS/ASC Structures, Structural Dynamics and Materials Conference 20th AIAA/ASMEIAHS Adaptive Structures Conference 14th A/AA, 2012, p. 1. [Abstract Only].

(56) References Cited

OTHER PUBLICATIONS

Dumont, E. R, "Laminates for mems and biomems," Proceedings of the Royal Society of London B: Biological Sciences, 2010, pp. 2193-2198. [Abstract Only].

Wood et al., "Liftoff of a 60mg flapping-wing MAV," IEEE, RSJ International Conference on Intelligent Robots and Systems, 2007, p. 1. [Abstract Only].

Bai et al., 2014 International Journal of Aeronautical and Space Sciences, 15, pp. 383-395.

August et al., "Recent Developments in Automated Fiber Placement of Thermoplastic Composites," 2014, Sampe J, vol. 50, pp. 13.

Vasiliev et al., "New generation of filament-wound composite pressure vessels for commercial applications," Composite Structures, vol. 62, Issues 3-4, 2003, pp. 449-459. [Abstract Only].

Vasiliev et al., "Anisogrid composite lattice structures—Development and aerospace applications," Composite Structures, vol. 94, Issue 3, Feb. 2012, pp. 1117-1127. [Abstract Only].

Trinh et al., "Robotically assembled aerospace structures: Digital material assembly using a gantry-type assembler," IEEE, Aerospace Conference, 2017, p. 1. [Abstract Only].

Recht Band D' Andrea R, IEEE Transactions on Automatic Control, 49, 2004, pp. 1446-1452.

Go et al., "Rate limits of additive manufacturing by fused filament fabrication and guidelines for high-throughput system design," Additive Manufacturing, vol. 16, Aug. 2017, pp. 1-11. [Abstract Only].

Brajlih et al., "Speed and accuracy evaluation of additive manufacturing machines," Rapid Prototyping Journal, vol. 1, Issue 1, 2011, p. 1. [Abstract Only].

Case et al., "Soft Material Characterization for Robotic Applications," Soft Robotics, vol. 2, No. 2, 2015, p. 1. [Abstract Only].

Cramer et al., "Design and testing of FERVOR: FlexiblE and reconfigurable voxel-based robot," IEEE, International Conference on Intelligent Robots and Systems, 2017, p. 1. [Abstract Only].

Espenschied et al., "Biologically based distributed control and local reflexes improve rough terrain locomotion in a hexapod robot", Robotics and Autonomous Systems, vol. 18, Issues 1-2, Jul. 1996, pp. 59-64.

Aage et al., "Giga-voxel computational morphogenesis for structural design", Nature, vol. 550, pp. 84-86, 2017. [Abstract Only].

Costs ST 2002 Futron Corporation.

\* cited by examiner

ELASTIC SHAPE MORPHING OF ULTRA-LIGHT STRUCTURES BY PROGRAMMABLE ASSEMBLY

This application relates to and claims priority to U.S. Provisional Patent Application No. 62/816,078 filed Mar. 9, 2019. Application No. 62/816,078 is hereby incorporated by reference in its entirety.

The invention was made with Government support under contract number NNX14AG47A awarded by NASA. The Government has certain rights in the invention.

BACKGROUND

Field of the Invention

The present invention relates to ultra-light, adaptive, shape-morphing structures, and more particularly to using ultra-light building blocks (cells) to create aerodynamic or other structures that respond favorably to aerodynamic loading.

Description of the Problem Solved

Across diverse fields, adaptive structures are finding an increasing number of applications due to their ability to respond to changing environments and use-cases. In architectural applications, a building envelope can respond to weather changes [1], whereas for civil engineering applications, a primary structure can respond to quasi-static and dynamic loading [2].

One of the most promising, and challenging, applications is adaptive aerostructures that respond to changing aerodynamic loading. The need to operate a single aircraft in highly disparate parameter envelopes (i.e., dash/cruise, takeoff/land, maneuver, loiter) over the course of a single flight necessarily results in sub-optimal aircraft performance during each portion of the flight [3], which results in lower fuel efficiency and greater direct operating cost.

Flexible mechanical systems, such as morphing wings, have been proposed to adapt wing geometry to changing flight conditions [4], seeking to increase performance at a range of air-speeds [5], reduce vibrations [6], increase maximum lift [7], decrease drag [8], and augment control of the vehicle [9]. However, scalable manufacturing and integration with traditional flight systems remain an open challenge [10]. The present invention addresses these issues with a programmable material system that can be mass produced and implemented as a high performance, conformable aeroelastic system.

Adaptive or shape-morphing aerostructures face a natural conflict between being lightweight and compliant enough to act as a mechanism, while also being able to bear operational loads [11]. Some proposed adaptive aerostructures leverage planar configurations that have much higher stiffness across an orthogonal out-of-plane axis that is oriented to maintain stiffness in one or more dimensions while allowing orthogonal dimensions to retain low stiffness for passive elastic behavior or case of actuation. Example prior art technologies include specialized honeycombs [8], corrugated designs [12], and custom compliant mechanism designs such as those developed by Kota et al. [13]. Planar designs generally choose a single loading plane to achieve airfoil camber morphing, span-wise bending, or span extension.

A truly generalized shape morphing structural strategy can provide for independent parameter control over the entire stiffness matrix. In this direction, higher dimensional tuning of structures and materials, including twist dimensions, have been achieved with elastomeric materials with high strain, energy absorption, and controllable compliance capabilities [14, 15, 16]. These materials accommodate considerable variation in designs and geometric complexity, but display lower specific modulus (higher mass density per stiffness) compared to the materials commonly used in large-scale high performance aerostructures, such as aluminum or carbon fiber reinforced polymers (CFRP). This presents a significant performance barrier with typical mass critical applications. Recent literature has shown how stiffness typically associated with elastomers can be attained at a fraction of the density through architected cellular materials [17, 18]. In addition to novel bulk properties, the ability to decouple and tune mechanical properties within a single material system is a longstanding goal within the mechanical metamaterial community [19]. The approach is to spatially vary microscopic properties, such as cell geometry, density, or material, to achieve programmable macroscopic properties, such as Young's Modulus, Poisson ratio, or shear/bulk modulus, across a single material system. Some prior art architected cellular materials have demonstrated such properties [20]. Yet scalability remains an open challenge due to inherent limitations of the manufacturing processes.

Many manufacturing scalability limitations of architected materials may be addressed through discrete assembly. High-performance architected materials can be made through the assembly of building block units [17], resulting in a high performance cellular material that can be mass manufactured at scale and programmed by assembly [21]. The building block approach has been successfully applied to a small-scale adaptive aerostructure [22], with components that were highly specific to single aircraft design, with part length scales equal to final system length scales. This limits the case of manufacturing and extensibility to different designs, a shortcoming shared with the aforementioned adaptive structure designs. Moreover, early examples do not leverage the natural application of programmable matter concepts [23, 24, 25] to building block based cellular solids. The present invention presents a strategy that seeks to incorporate manufacturing at scale and extensibility across designs and applications.

SUMMARY OF THE INVENTION

The present invention combines concepts from assembled architected materials and programmable matter to demonstrate programmable deformation of an air vehicle in response to aerodynamic loading. A set of basic building blocks are coupled together with interface parts and finally an outer skin is attached to form an aerodynamic structure such as an aircraft wing. The basic building blocks are 3-dimensional parts such as octahedral unit cells. The interface parts are molded parts that connect the unit cells together to form a cubooctahedral lattice. The skin is a collection of flat and curved plates that are designed to overlap one-another.

Using a building block methodology based on the cubocbuildctahedral lattice, we have designed and built, as a particular embodiment of the invention, two 4.27 m span lattice wing structures, one of which is shown in FIG. 1D. A first baseline homogeneous structure, comprised of just one building block type, served as an experimental control for a second heterogeneous structure, which used two types of building blocks to program aeroelastic structural response for increased aerodynamic efficiency. In addition to passive shape change, the present invention relates to the addition of an actuation system that can create an active structural mechanism for roll control during flight. The design process, embodiments of built structures, and results from wind tunnel testing are described herein.

DESCRIPTION OF THE FIGURES

Attention is now directed to several figures that illustrate features of the present invention.

Several illustrations have been presented to aid in understanding the present invention. The scope of the present invention is not limited to what is shown in the Figures.

DESCRIPTION OF THE PREFERRED EMBODIMENTS

For the development of a programmable elastic shape morphing aerostructure, the present invention leverages the modular nature of the system to facilitate rapid development. In the following description, tools, methods, and components of the work-flow will be highlighted, including the building block-based design, interface and skin blocks, computational design assessment, and finally the experimental set-up.

The building block toolkit consists of three part categories: substructure, interface parts, and skin. In total, there are nine unique structural part types, with quantities summarized in Table B1. In the following sections, we describe the design and integration of each of these categories.

Substructure Building Blocks

Figure 1:
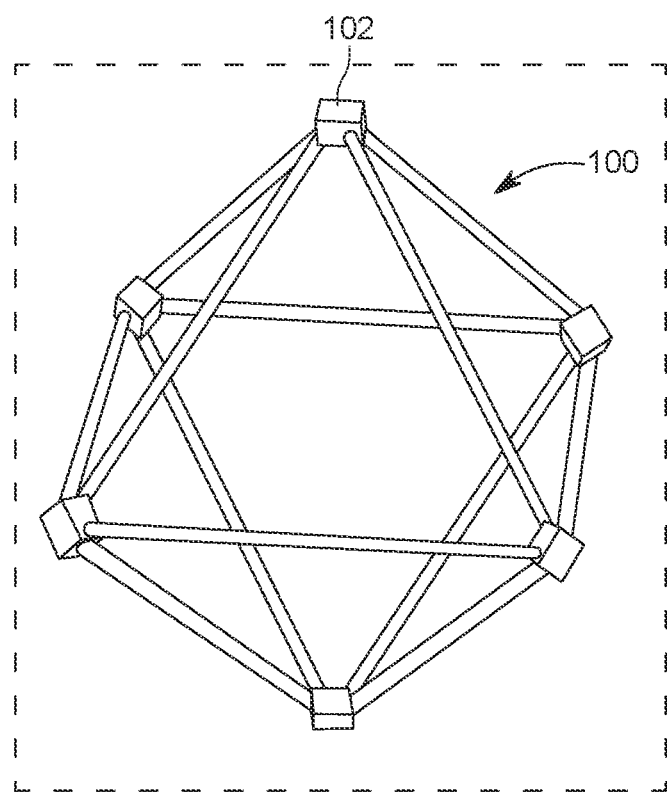
FIG. 1A shows a basic octahedral unit block.
FIG. 1B shows a single half-wing structure comprising 2088 building blocks.
FIG. 1C shows a 4×4×4 unit cube.
FIG. 1D shows a blended wing body structure with skin mounted to a central load balance for testing.
Figure 1B:
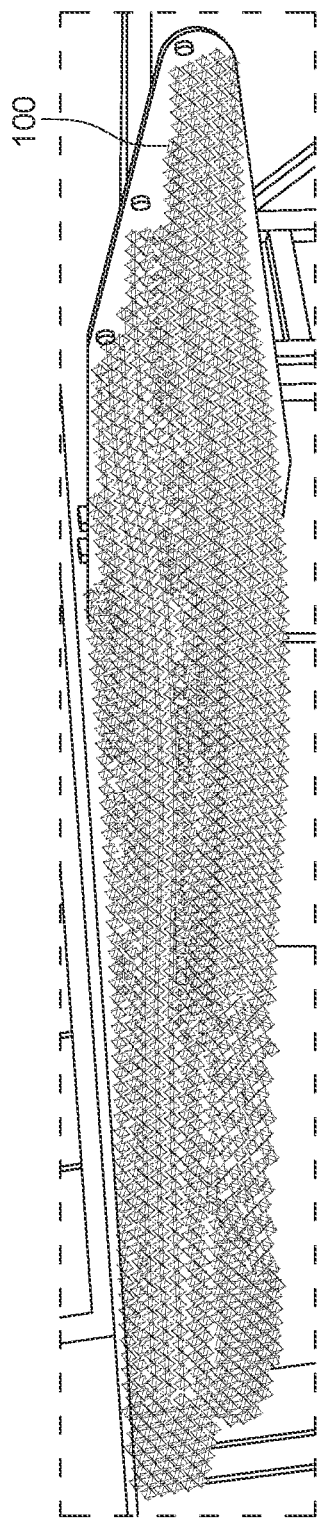
Figure 1C:
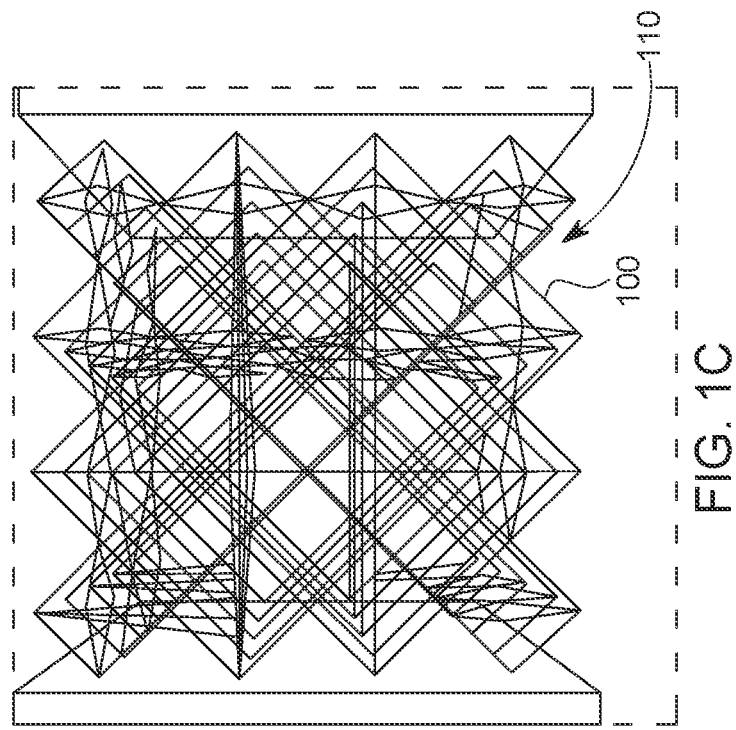
Figure 1D:
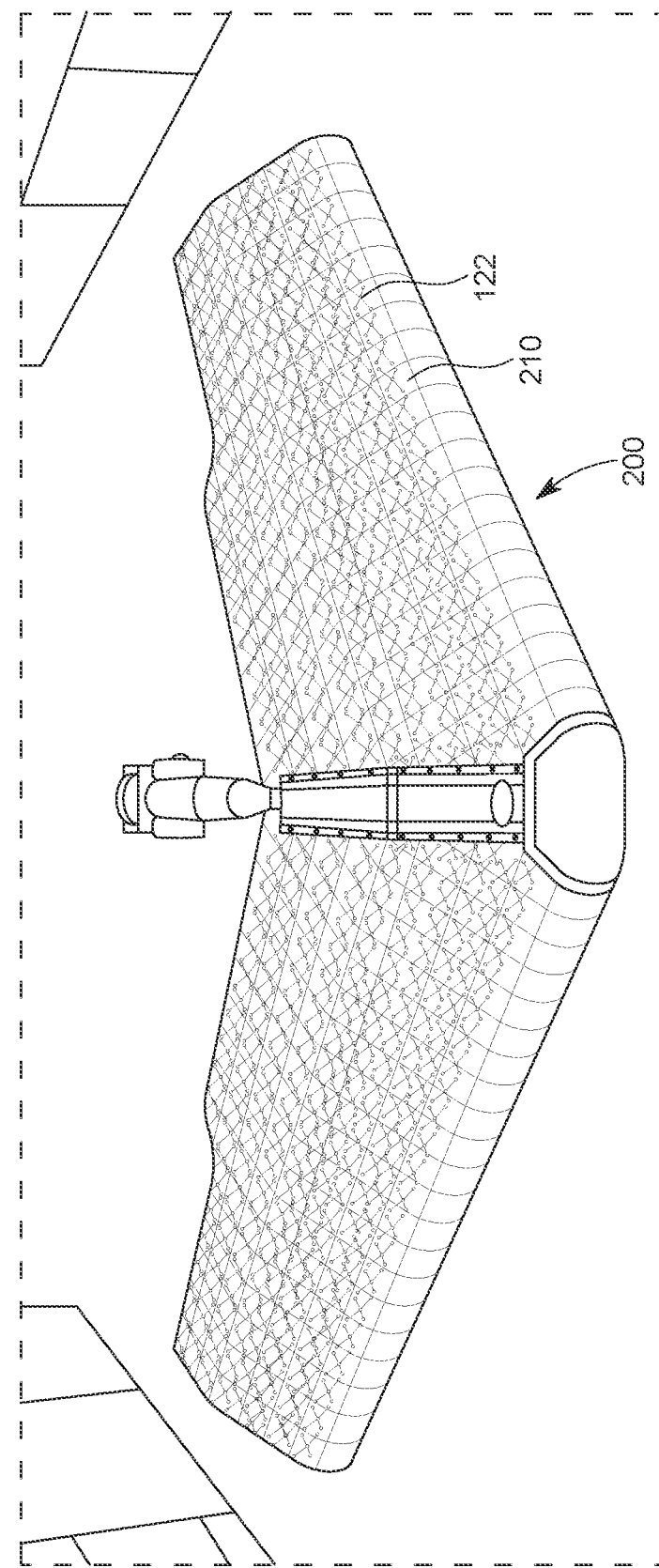

The main substructure building blocks 100 used here are octahedral unit cells (FIG. 1A), which, when connected at their nodes 102, produce a cuboctahedral lattice structure 110 (FIG. 1C). Octahedra of two different materials were used: polyetherimide (PET) with 20% short chopped glass fiber reinforcement and un-reinforced PET (Ultem 2200 and Ultem 1000, respectively). It is accepted in the cellular solids literature that the resulting structure can be considered as a continuum metamaterial, modeled with standard bulk material mechanics methods. Accordingly, the Ultem 2200 lattice material, which formed the majority of the test samples, displayed absolute stiffness behavior of (8.4 MPa) [21], which is comparable to a bulk elastomer material such as silicone, but at roughly 0.5% of the density (5.8 versus 1200 kg/meter cubed). FIG. 1B shows a single half-span wing structure composed of 2088 building blocks 100. FIG. 1D shows a blended wing body aerostructure 200 with skin mounted to a central load balance in a 14×22 subsonic wind tunnel at NASA Langley Research Center.

Interface Building Blocks and Skin

The interface building block set connects the vertices of the substructure building blocks to the skin components and the root and tip plates. There are several interface types: flat 120, slope 160, leading edge 140, transition 150, and plate mounting 130.

Figure 2A:
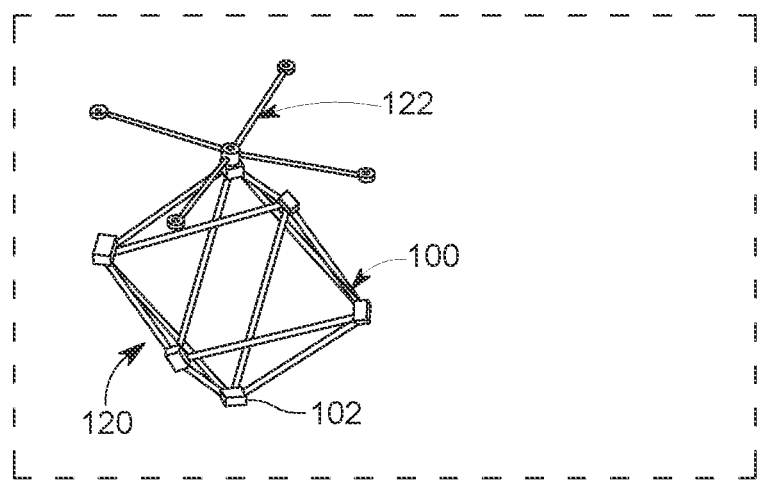
FIG. 2A shows a skin interface part attached to a unit cube.
Figure 2B:
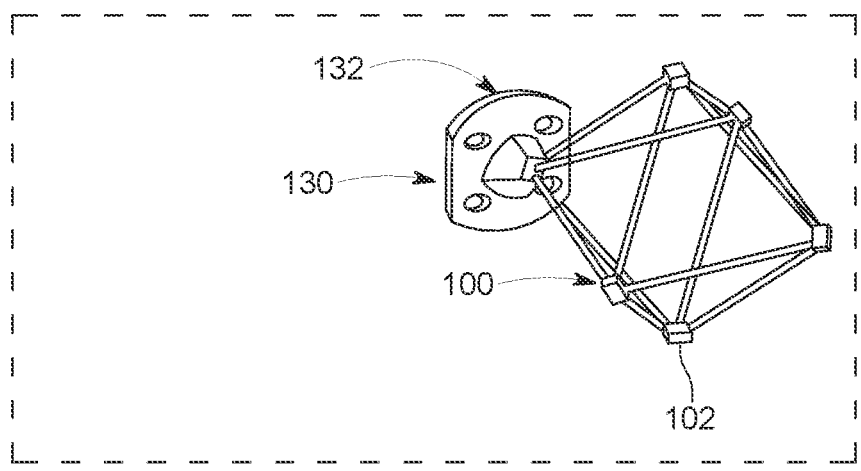
FIG. 2B shows a plate mounting interface part attached to a unit cube.
Figure 2C:
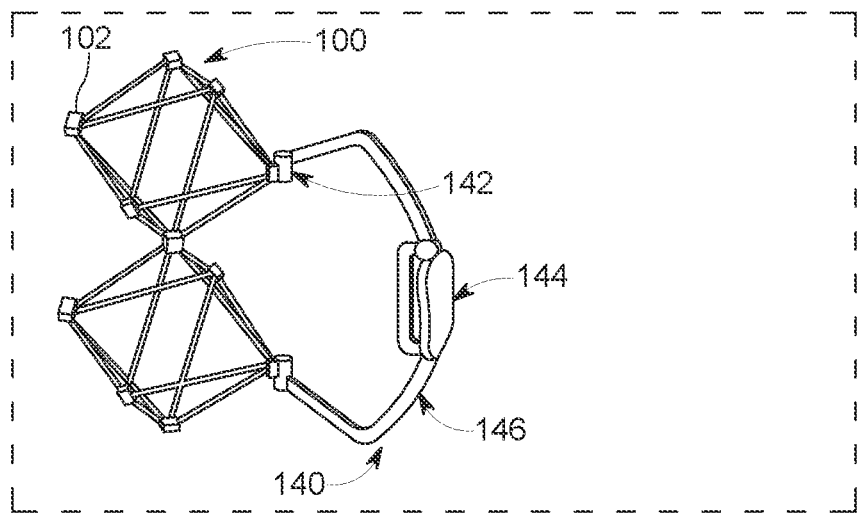
FIG. 2C shows a leading edge interface part attached to two unit cubes.
Figure 2D:
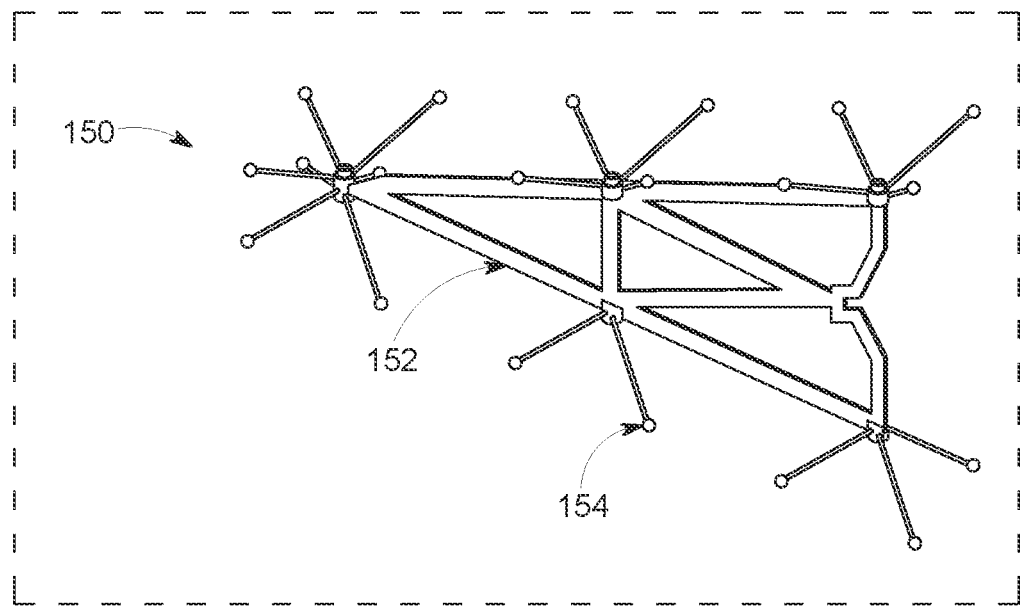
FIG. 2D shows a series of connected transition interface parts.
Figure 2E:
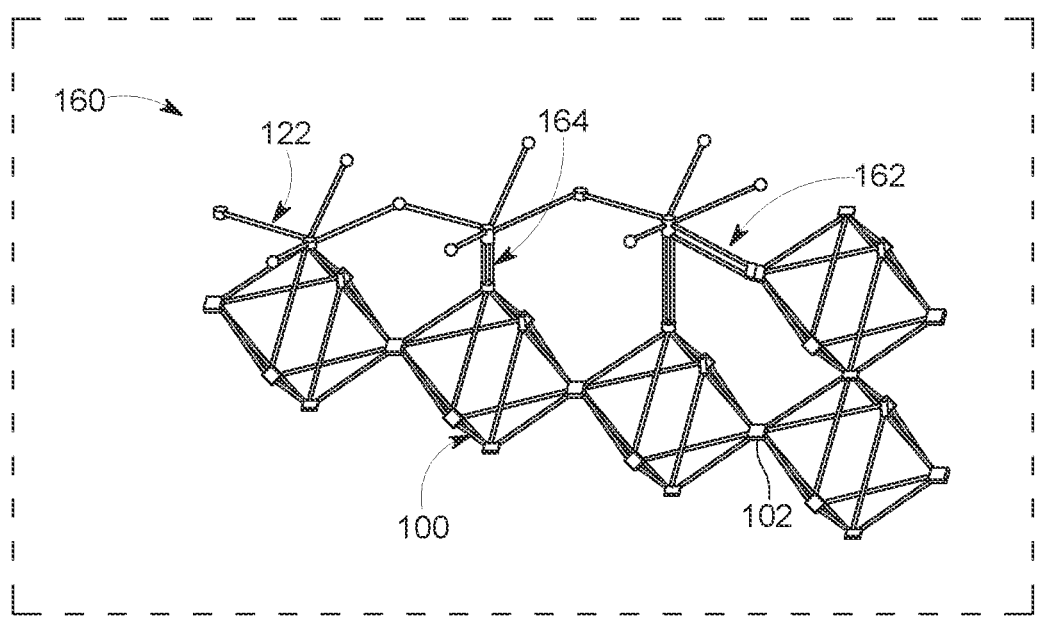
FIG. 2E shows a slope assembly.
Figure 3A:
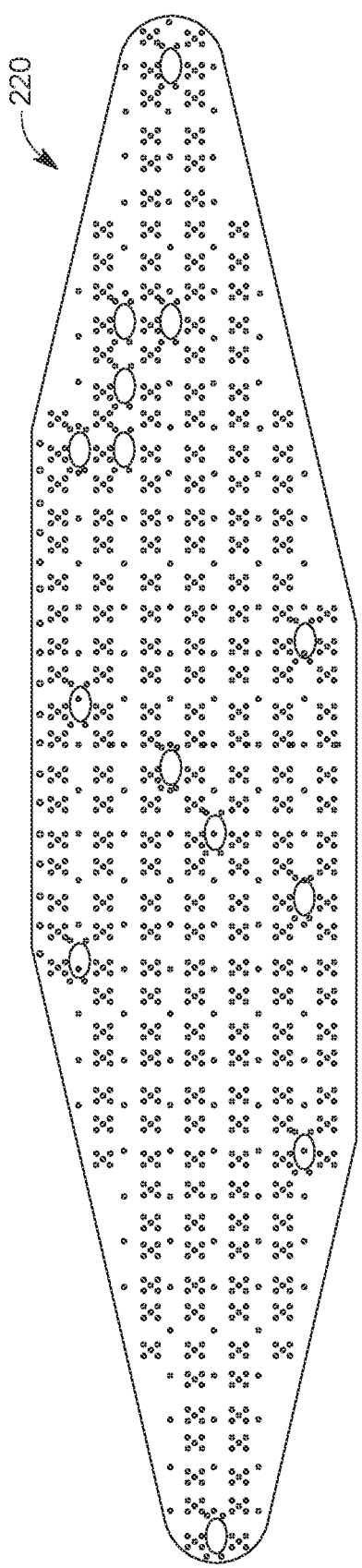
FIG. 3A shows a root plate.
Figure 3B:
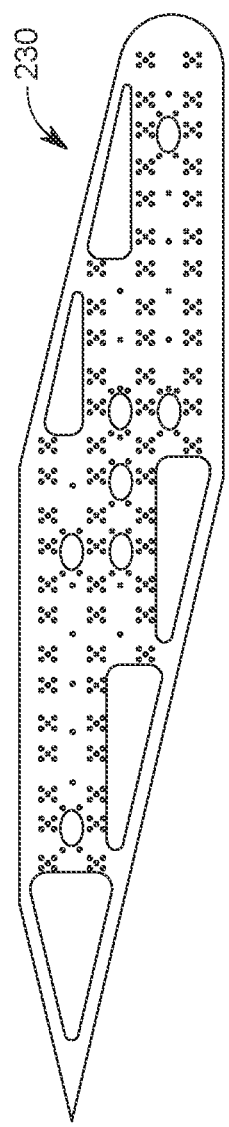
FIG. 3B shows a tip plate.

Flat interface parts 122 mount to the exterior of the substructure in flat regions to provide mounting points for the skin panels 210 (FIG. 2A). Slope parts 160 consist of a single skin interface part 122 and two spacing parts 162, 164, which combine to connect skin and substructure across a 3:1 slope region (FIG. 2E). All of these components are made of injection molded RTP 2187 (40% carbon fiber reinforced polyetherimide). The leading edge components 140, also shown in FIG. 2C, are comprised of 3D printed interface parts 142, 144 to connect to the lattice and a lasercut engineering plastic section 146 to follow the leading edge geometry. There were a total of 302 interface parts and 35 leading edge assemblies on each half span. Transition components 150 were also needed in the region where multiple slopes intersected near the middle of the wing. These components were also made from 3D printed struts 154 matching the skin hole pattern and a lasercut engineering plastic core plate 152 (FIG. 2D). At the root and tip section, injection molded plate mounting components 132 (FIG. 2B) were designed to interface with the aluminum root plate 220 and the carbon fiber tip plate 230. These components, shown in FIGS. 3A and 3B, utilized 10-32 screws to interface to those plates. There were a total of 384 for the root plate, and 122 for the tip plate. The root plate 220 is a single 6.35 mm thick aluminum plate, with holes and features milled and tapped as shown. The tip plate 230 is 1.6 mm thick carbon fiber plate, waterjet cut as shown.

The skin is designed to transfer aerodynamic pressure loads directly to the substructure through the interface parts 122, 154. Panels 210 are not interconnected and thus do not behave as a structural stressed skin. Neighboring panels 210 overlap by 10.2 mm to ensure a continuous surface for airflow while still allowing panels 210 to slide past one another during aeroelastic shape change. Prior experiments observed minimal aerodynamic effect of ventilation through such overlapping skin panels [22]. The basic skin design was a the section of the wing that it attached to (flat, sloped, or transition areas). The parts are 0.254 mm thick PEI (Ultem)

film and were cut using a CNC knife machine (Zund). The film had a matte finish to reduce reflectivity and mitigate potential issues with a motion capture system (Vicon). The majority of the surface was covered by flat and slope pieces and about 78% of the total surface area was covered by toolbox skin pieces. Custom pieces were only required for complex transition regions and for the areas at the root and tip to be attached onto the end plates. A single half span has 248 basic skin building blocks and 54 custom parts. A complete list of the parts used is presented in the Appendix B.

Figure 4A:
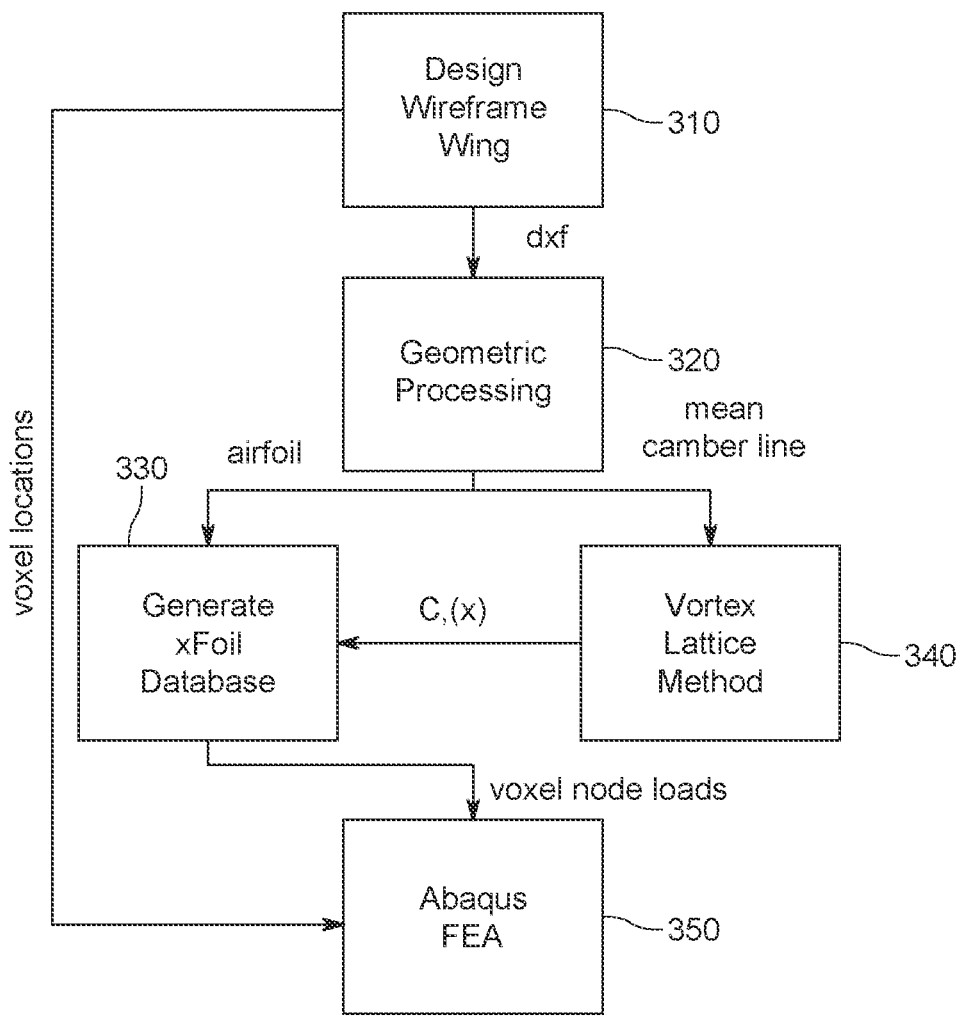
FIG. 4A shows a flow chart of an airfoil section design.

Assuming this base set of the substructure, interface, and skin building blocks, the final design of our aerostructure resulted from an iterative process described here and shown in FIG. 4A. Our design goals were to maximize the aerodynamic loading of the aerostructure while maintaining the appropriate safety factor for testing. The initial designs in FIG. 4B achieve this by creating a low-speed variation of the early concept of a blended-wing body (BWB) geometry presented by Liebeck [27]. Once we achieved a design with sufficient safety factors under low-speed loading, we began to explore design parameters for stability and controllability. As is common with BWB or flying wings, we used wing sweep to augment pitch stability [28] and dihedral as a means of lateral stability [29].

Figure 4B:
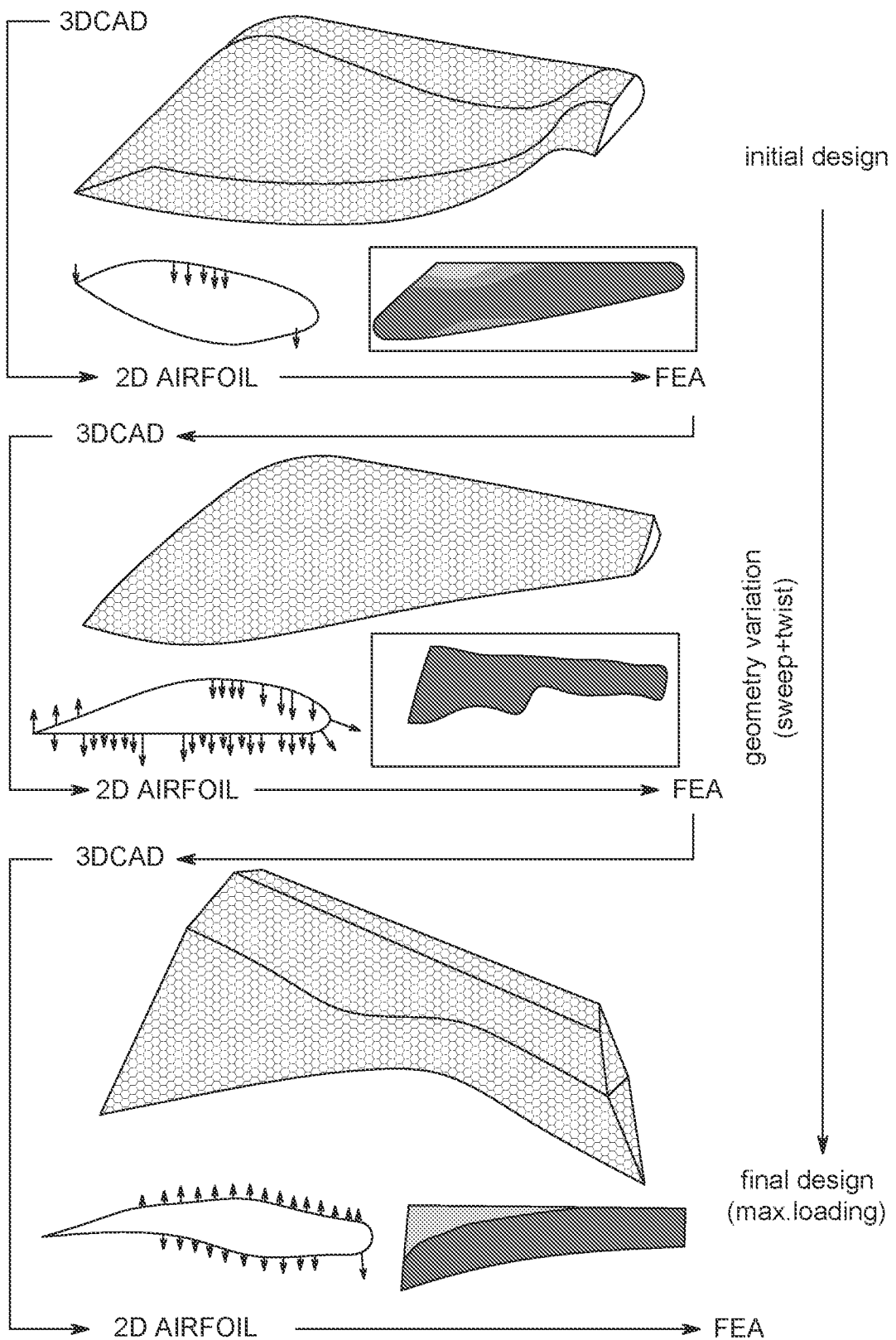
FIG. 4B shows the iterative process to arrive at a final 3-D design.
Figure 4C:
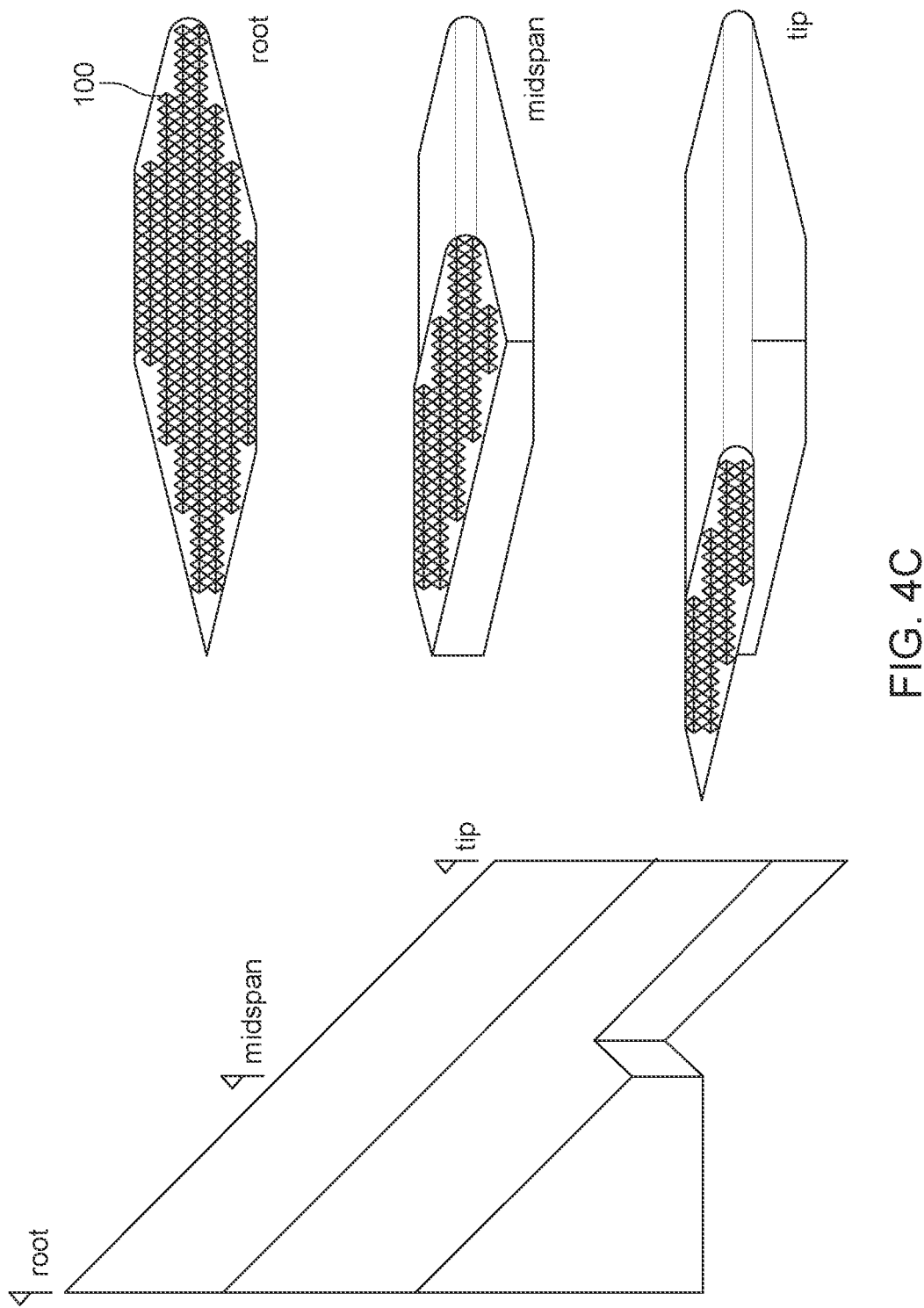
FIG. 4C shows the final design.
Figure 4D:
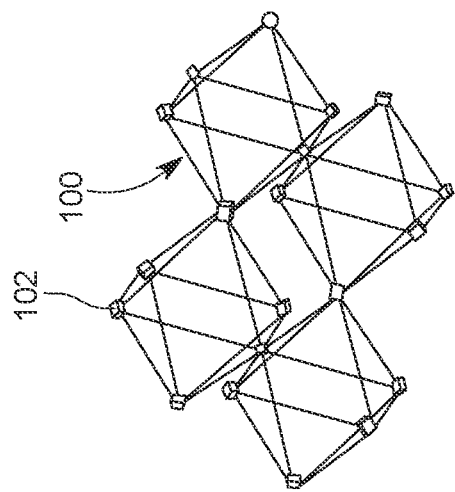
FIG. 4D shows a group of substructure building blocks.
Figure 4E:
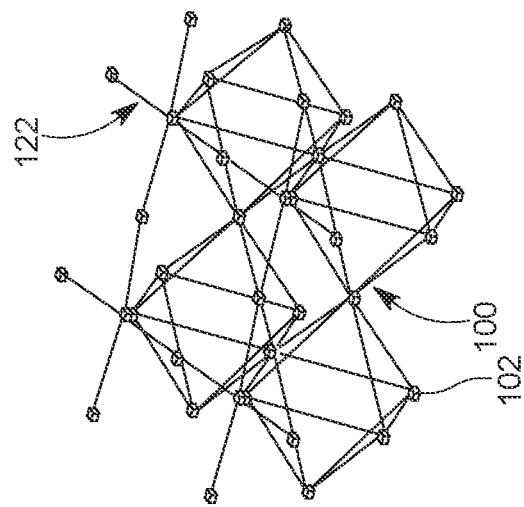
FIG. 4E shows the blocks of FIG. 4D connected to skin interface blocks.
Figure 4F:
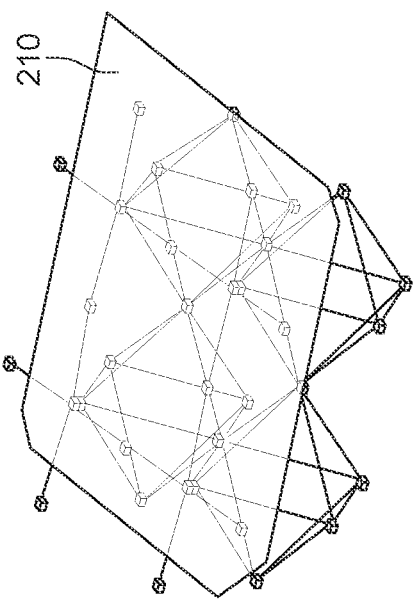
FIG. 4F shows the skin interface blocks of FIG. 4E connected to a skin panel.
Figure 4G:
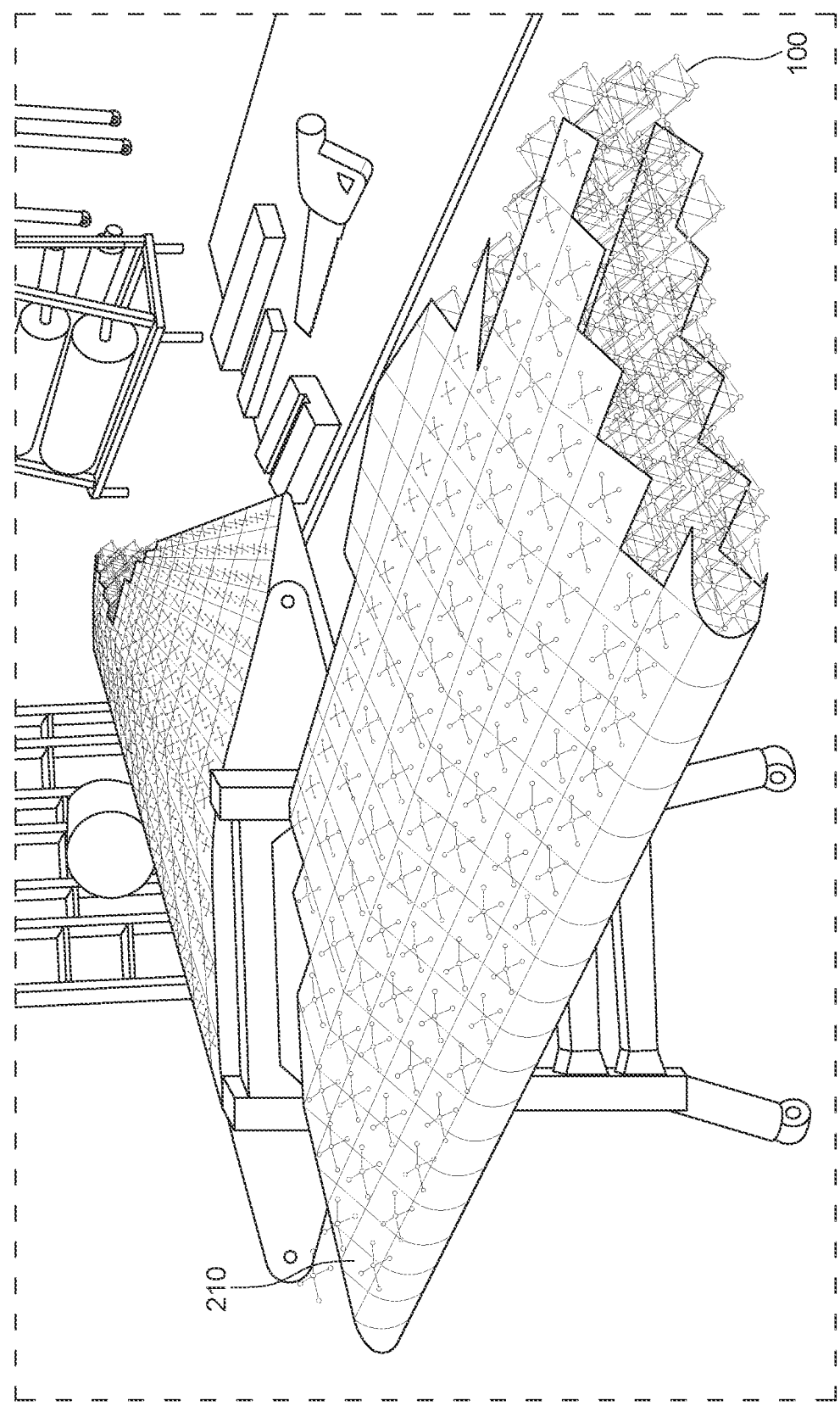
FIG. 4G shows a large scale ultralight aerostructure near completion of manufacturing.

FIGS. 4A-4G show a building block toolkit design workflow for ultralight aerostructures. FIG. 4A shows the airfoil section design, 3D lattice material aerostructure, and FEA with aerodynamic loading and elastic deformation. FIG. 4B shows the iterative process utilizing software work-flow to arrive at a final design. FIG. 4C shows a final Design. FIG. 4D shows substructure building blocks 100, FIG. 4E interface building blocks, FIG. 4F a skin building block and FIG. 4G shows a large scale ultralight aerostructure near completion of manufacturing.

The computational workflow shown in FIG. 4A starts with the build-up of the substructure from using the octahedral building blocks in step 310. Once this geometry is generated (using Rhino3D CAD software), in step 320, the substructure wire-frame was partitioned (using MATLAB) into 77.1 mm (3 in) span-wise segments from which the true airfoil shape and mean camber line were determined. In step 330, this airfoil shape was then evaluated for pressure distribution (using XFOIL) at a Reynolds number of 3.5e6 from angle of attack −35° to 35° by increments of 0.1°. The resulting distribution was used to determine the nodal loads via application of the sectional air pressure loads to the nearest node. At step 340, the vortex lattice panels were uniformly distributed with 20 chord-wise and 150 span-wise panels on the mean camber line. The local lift coefficient as determined by the vortex lattice method was matched by the pressure distribution results to determine the appropriate loading for structural FEA (ABAQUS) in step 350. Each strut was represented as four subdivided beam elements (ABAQUS B31) with stiffness of 6.895 GPa (1e6 psi) and density of $1.42 \times 10^7$ kg/m$^3$ ($1.329 \times 10^{-4}$ lbf s$^2$/in$^4$). These are datasheet properties, and we expect the stiffness values to be conservative due to fiber alignment in the actual struts. The nodes were modeled using a short element (ABAQUS B31) of length 7.62 mm (0.3 in), which matches the actual node length of the building block part. This short beam element was assigned a stiffness of 68.95 GPa ($1 \times 10^7$ psi) to simulate increased stiffness in the nodes. The simulations were run with an assumption of geometric non-linearity (ABAQUS NLGEOM ON) due to expected large displacements within each individual strut. A time step limit of $1 \times 10^{-5}$ was used to help with convergence issues.

When designing heterogeneous models, it was necessary to account for the unique material properties of the different building block materials, which were produced using the same mold tooling. The unfilled PET parts showed a higher coefficient of thermal expansion that resulted in a fractionally smaller part at final experimental temperatures. The use of slightly different sized parts induces a small amount of residual stress in the structure, which was simulated in our FEA assessment by initializing the full assembled model at mold temperature and evaluating the structural response after a simulated drop to final experimental temperature. Further details of the modeling can be found in I~301.

The heterogeneous structure was programmed following these guidelines, with the unfilled PEI considered as new voxel groupings:
  (i) All second voxel type groupings are limited to linear string shapes.
  (ii) No second voxel type grouping string can be longer than three blocks long.
  (iii) Second voxel type grouping strings can not be placed within two unit spaces of each other.
  (iv) Second voxel type grouping strings placed spanwise will reduce bending and torsional stiffness.
  (v) Second voxel type grouping strings placed chordwise decreases airfoil shape stability.
  (vii) Second voxel type grouping strings reduce the total length of building block extrusion.

The first three rules were created to limit the effect that the residual strain would have on the outer mold line and allow for functional assembly. The last three are principles and are used as design mechanisms. With these rules and principles, the heterogeneous structure was programmed to increase the lift and drag by intelligently inducing twist and increasing camber. A second objective that coincided with the first was to improve the efficacy of the torque rod used as an actuation mechanism. The twist is achieved by placing unfilled PET chains along the span, but they were biased towards the center of the span to take advantage of (vi) by reducing the center of the outboard wing section and inducing twist. We increased camber by placing chordwise unfilled PET string on the bottom half of the inboard section effectively reducing the stiffness of that section and encouraging increased camber.

Experimental Setup

We performed the experiments in the NASA Langley Research Center 14×22 foot subsonic wind tunnel. Unless otherwise noted, the dynamic pressure of the experiments was 95.76 Pa (2 psf). The angle of attack ranged from −4 degrees to 18 degrees with an accuracy of plus or minus 0.05 degrees, measured with a standard inertial measurement unit (Honeywell Q-Flex). Temperature readings were taken with a standard temperature transducer (Edgetech Vigilant) with an accuracy of plus or minus 0.36 degrees F. The load measurements were taken with a custom balance (NASA) that was designed to a normal load limit of 2224 N (500 lbs), axial load limit of 667.2 N (150 lbs), pitch torque limit of 677.9 Nm (6,000 in-lbs.), roll torque limit of 226 Nm (2,000 in-lbs.), yaw torque limit of 226 Nm (2,000 in-lbs.), and side load limit of 667.2 N (150 lbs). The full model was fixtured by the load balance near the expected center of mass. The load balance was fixtured to the tunnel via an approximately 2.79 m sting setup. The displacement data was collected through a standard motion capture (VICON) system with four cameras placed in the ceiling of the wind tunnel. Retroflective tape circles of 12.7 mm (0.5 in) diameter were placed on the model skin surface at every other lattice building block center, 154.2 mm (6 in) apart from each other, as well as on the leading edge and trailing edge tip.

Results

Results broadly fall into two categories, the proof of concept simulation design results and the experimental results. The simulation results showed that the work-flow presented above is capable of generating significant passive performance increases. The experimental results validate numerical predictions and demonstrate full-scale performance of our novel aero structure.

Simulation Results. Programmed Heterogeneous Design and Anisotropic Tuning

We used simple heuristics for a first order exploration of the design space of our set of building blocks in simulation to demonstrate tuning ability and the associated expected performance improvements. The anisotropic tuning simulations were done with the same ABAQUS settings as above. To amplify the effects of heterogeneity for the purpose of this study, we used two materials with two widely different Young's moduli-aluminum and PTFE, which were 68.95 GPa ($1\times10^7$ psi) and 0.6895 GPa ($1\times10^5$ psi) respectively.

The wing with a lower stiffness polymer at the leading edge and a uniform load placed at the bottom of the wing, resulted in the wing tip twisting up. The same load with a different distribution of the building blocks resulted in no tip twist and a negative tip twist with the same tip displacement. Each of these programmed mechanisms can have advantages depending on the mission criteria; for instance, if the aircraft's expected operational regime were long-duration cruise, a configuration with the tip twisting up under load would be better. This results in a "wash-in" at low angles of attack. If the aircraft were going to be performing high angle of attack maneuvers, or carrying high loads, then a configuration that results in a "wash-out" (which is desirable for enhanced stability at high angles of attack that delay stall, and therefore has higher performance) is more desirable. This design flexibility extends the application space for a single building block set.

Experimental Results and Validation

We present three primary experimental results: 1) Validation of numerical and analytical methods through quasi-static load testing, 2) programmable anisotropy for performance improvement through programmed heterogeneous design, 3) adaptive aeroelastic shape morphing.

Quasi-Static Substructure Validation

With an ultra-light structure, qualification of load-bearing capability is particularly important for safe testing and application. For wings, this is often done with a test that quasi-statically simulates the expected aerodynamic loading. We performed this testing using a Whiffletree Device. The tree linkages were sized and spaced to take a single point load and distribute it to many smaller point loads across the top layer of substructure building blocks. This load profile approximated a worst-case aerodynamic loading pattern determined using the aforementioned numerical methods. This accounted for chord-wise loading distribution per a distribution of sample cross sections, and span-wise loading was approximating an elliptical load distribution.

In this case, Whiffletree testing of the substructure provided validation of the simulation and prediction methods, which also demonstrated the robustness of the test structure. A fundamental assumption accepted in the literature on cellular materials is that of continuum behavior, allowing material characterization with traditional coupons to be extended to predicting stress and strain distribution in objects of irregular shape and non-uniform loading [26, 31]. This assumption was also fundamental to our design method, though there is little in the prior literature representing the large-scale application of periodic engineered cellular materials. The ABAQUS results accurately predict the load response through the linear region. At the extremes, there are small deviations in the anticipated versus experimental results. At low loading, the difference in prediction and experimental results is probably due to settling in the Whiffletree structure as small manufacturing inconsistencies in the cables, beams, and attachment devices take upload. The experiments were stopped at the first sign of nonlinearities in the displacement versus loading; the simulations predict the early onset of nonlinearity due to local buckling. We explain this as numeric softening due to complex interactions between the spatial resolution of the beam subdivisions and nodal attachments. The static load experiments verify three-dimensional engineered cellular solids modeling at an application scale that is much larger than previously published [21].

Aerodynamic Efficiency Gains Through Substructure Programmability

Figure 5B:
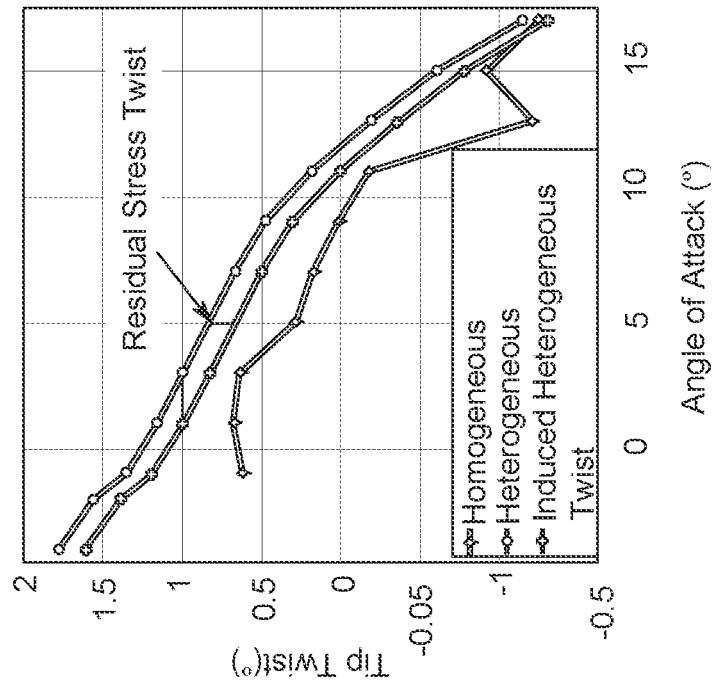
FIG. 5B is a graph of tip twist vs. angle of attack.
Figure 5A:
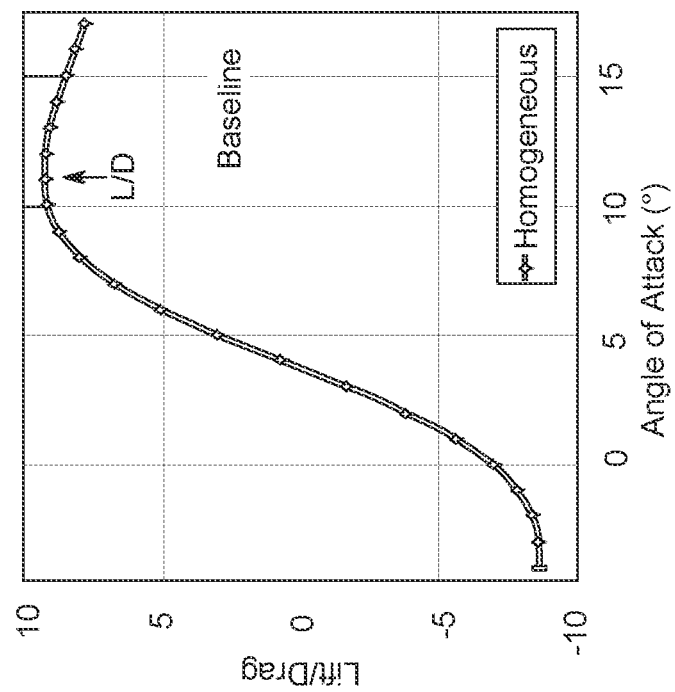
FIG. 5A is a graph of lift to drag vs. angle of attack for a completed homogeneous wing.

The primary goal of wind tunnel testing was to evaluate the ability of the programmed heterogeneous aerostructure to increase aerodynamic efficiency compared with the homogeneous aerostructure. When evaluating commercial flight systems, it is useful to split a typical mission profile into three main phases: take-off, cruise, and landing. To maximize the total system efficiency, the cruise condition is typically assigned as the mode with the maximum lift-to-drag ratio. FIG. 5A shows the lift to drag ratio of the baseline homogeneous wing over various angles of attack, and the cruise condition is labeled as $L/D_{baseline}$. This value serves as the point of comparison to evaluate the efficacy of tuning in the programmed heterogeneous model. Angles of attack above and below that point represent take off and landing regimes respectively.

The aerodynamic performance of the programmed heterogeneous model was tuned by several means. Aerodynamic loads induced further tip twist and deformation according to the programmed torsional stiffness of the substructure. We show the tip twist for both the baseline homogeneous and programmed heterogeneous models in FIG. 5B, with a separate curve estimating the tip twist due to aeroelastic tuning alone, by removing the simulated twist due to residual stress. Un-filled PET parts were also placed orthogonal to the span-wise pattern to add additional camber and inboard lift. This pattern can be seen in the inset of FIG. 5C. While the canonical discretized shape was identical to the baseline homogeneous model, the actual unloaded shape of the programmed heterogeneous model was slightly changed due to residual stress arising from slight dimensional differences between the parts by the constituent material.

Figure 5C:
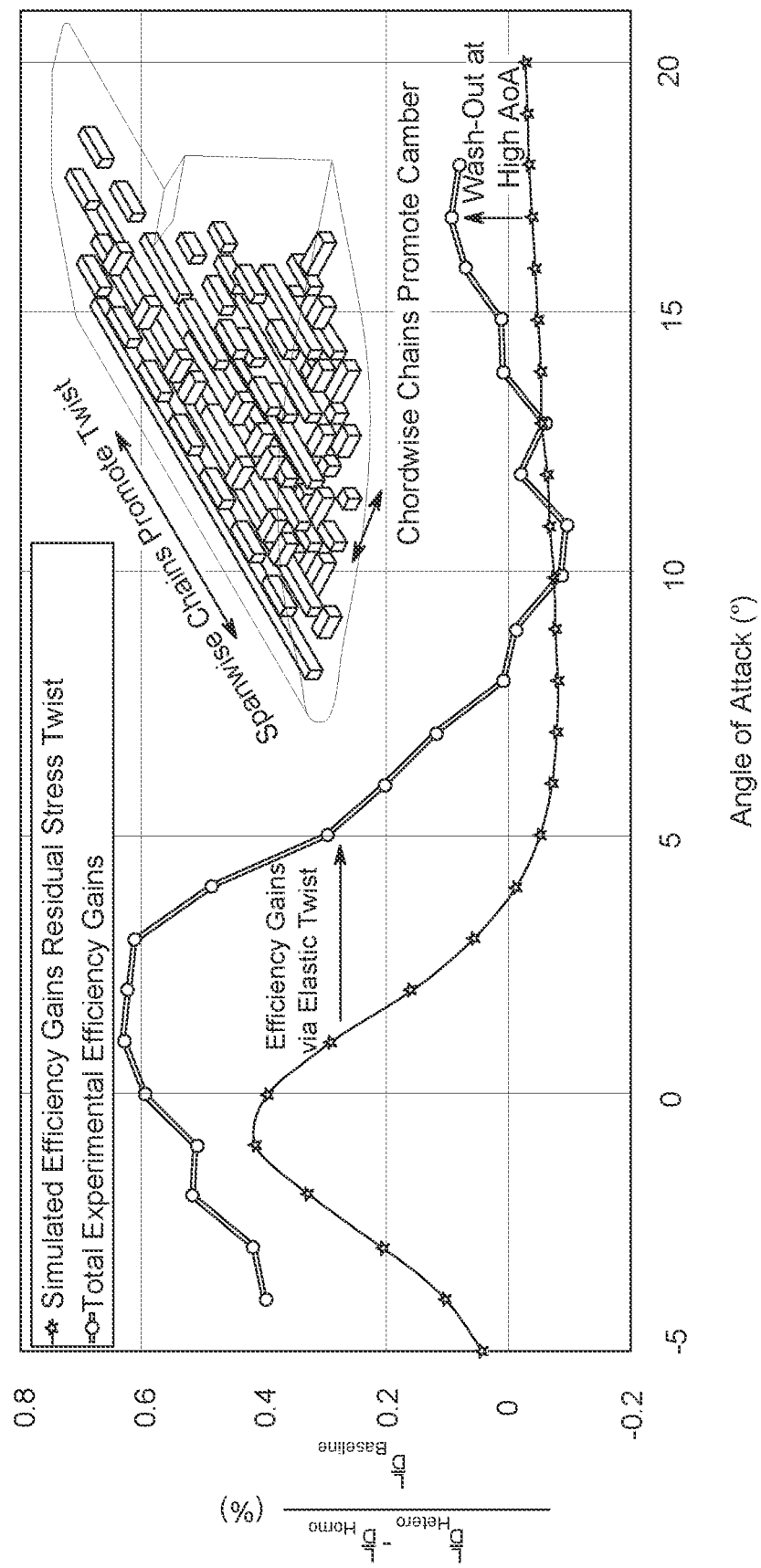
FIG. 5C is a graph of total efficiency gains via elastic twist of the wing.

FIG. 5C shows the increase in the lift to drag ratio for the programmed heterogeneous structure relative to the baseline homogeneous structure. The lower line shows the simulated efficiency gains from the static residual stress twist, and the top line shows the total measured efficiency gains. The difference between the two is the efficiency gain from the change in substructure torsional stiffness response. This also shows that the aerodynamic efficiency gains were not solely from initial residual stress induced shape change, but also due to the programmed anisotropic substructure stiffness promoting tip twist under aerodynamic loads. It also demonstrates that the alteration of the stiffness can enhance off-design condition efficiency during flight phases such as take-off, landing, or other maneuvers (angles of attack above and below cruise). Overall, the combined effects of the anisotropic tuning resulted in anisotropic structural response and efficiency gains, which are the primary goals of the present invention.

Figure 6A:
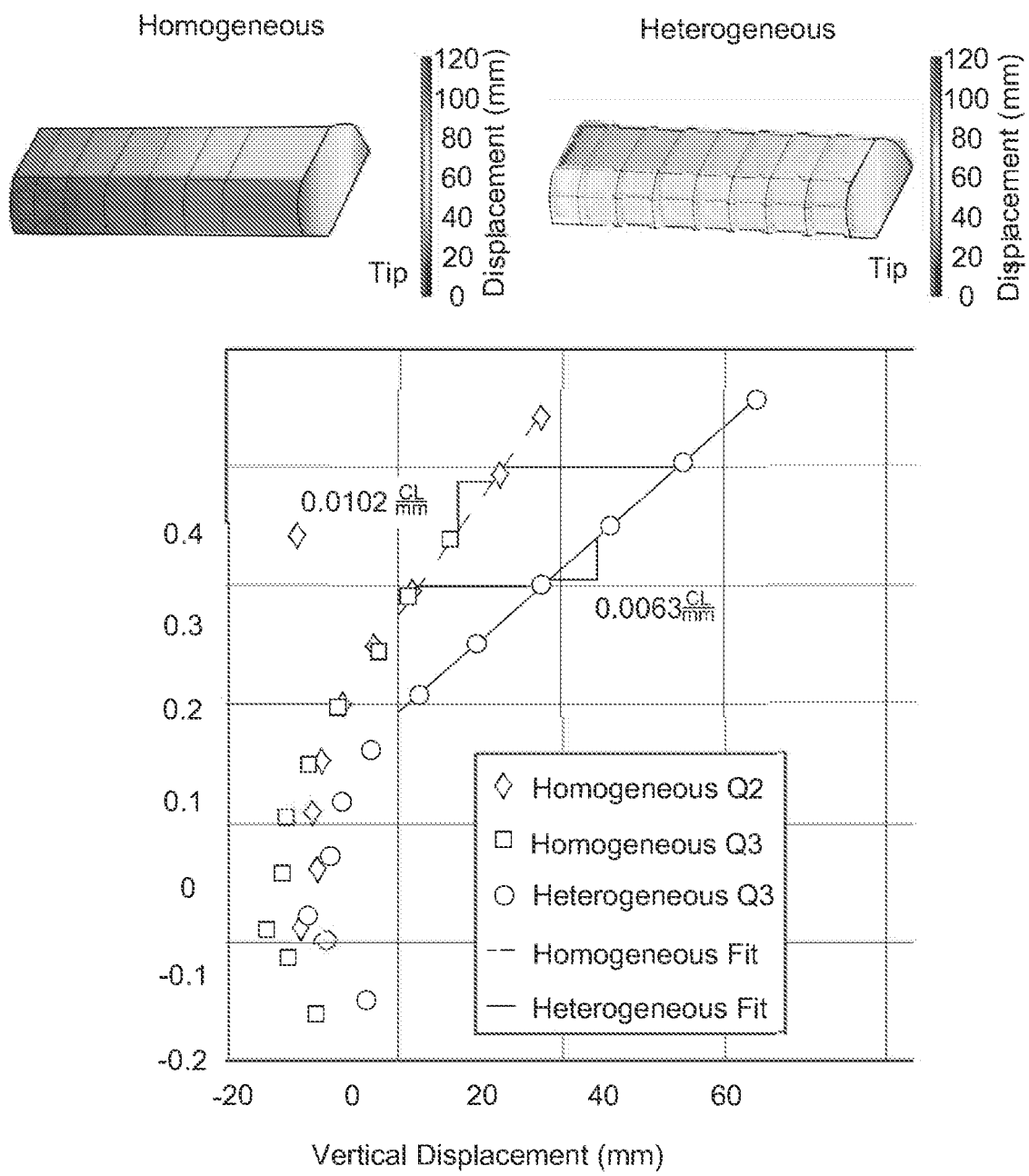
FIG. 6A is a graph of lift coefficient vs. vertical lift displacement.
Figure 6B:
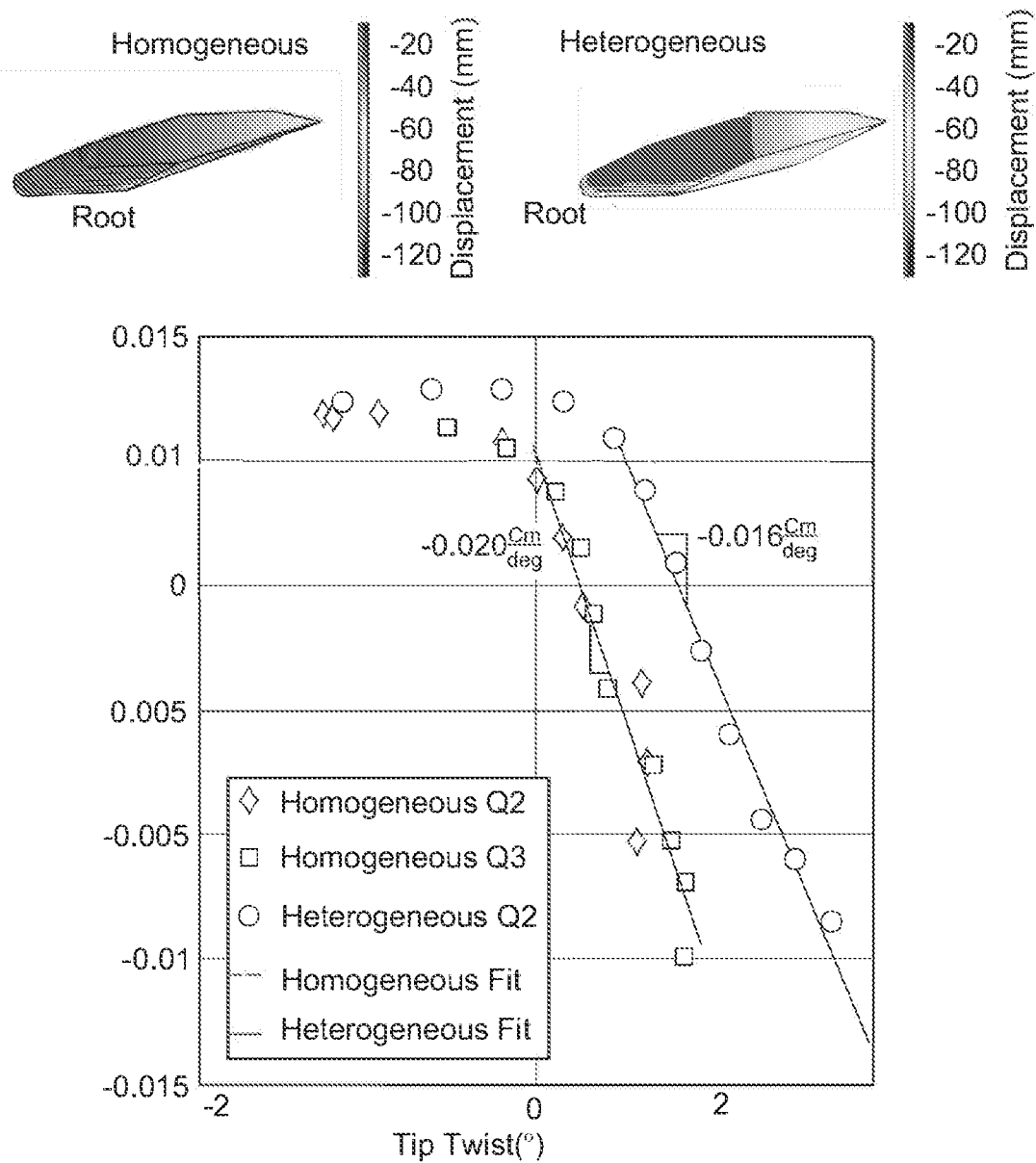
FIG. 6B is a graph of pitching moment vs. tip twist.

Though a relatively small change in the substructure, strategic choice of replacement locations produced significant changes in the normalized aeroelastic stiffness. The programmed heterogeneous aerostructure contained 17% (347 total) building blocks that were more compliant Ultem 1000. The global torsional stiffness decreased by approximately 43% while the bending stiffness was reduced by about 46%. FIGS. 6A-6B show the vertical displacement of the tip versus the coefficient of lift in FIG. 6A, as well as tip twist angle versus pitching moment coefficient in FIG. 6B. The nonlinear sections of FIG. 6B, suggest an onset of tip stall at the higher loading conditions that support the observation of the mechanisms for increased aerodynamic efficiency made in the previous section. The slope of the linear sections in each Figure represents the normalized global aeroelastic bending and torsional stiffness, respectively.

We also evaluate the wing deformation by reconstructing the geometry based on motion capture data, described in further detail in the appendix. The charts representing baseline homogeneous and programmed heterogeneous experiments in FIGS. 6A and 6B show wing deformation at the specified loading condition. The baseline homogeneous span-wise deflection in FIG. 6A shows that at the high loading conditions in the linear regime, the trailing edge tip has the largest amount of deflection, whereas for the programmed heterogeneous experiment the largest amount of displacement is toward the root. This may be seen as analogous to alteration of the primary structural mode affected by aerodynamic loading. The sub-figures of FIG. 6B show the twist variations at low angles of attack, which helps to explain the significant performance increase seen in FIGS. 5A-5C at low angles of attack, since the trailing edge of the programmed heterogeneous model is lower, resulting in a forward twist that augments lift.

Adaptive, Shape Morphing Structural Mechanism

The full potential of the structural tuning extends beyond passive aeroelastic response to programmed aero-servo elastic mechanisms. With a torque rod from the center body section to the wing tip, we demonstrate wing structure behavior as an elastically tuned shape morphing structural mechanism. The torque rod drives the tip twist in the system, and the programmed substructure translates the singular point torque into a global shape deformation.

Figure 7A:
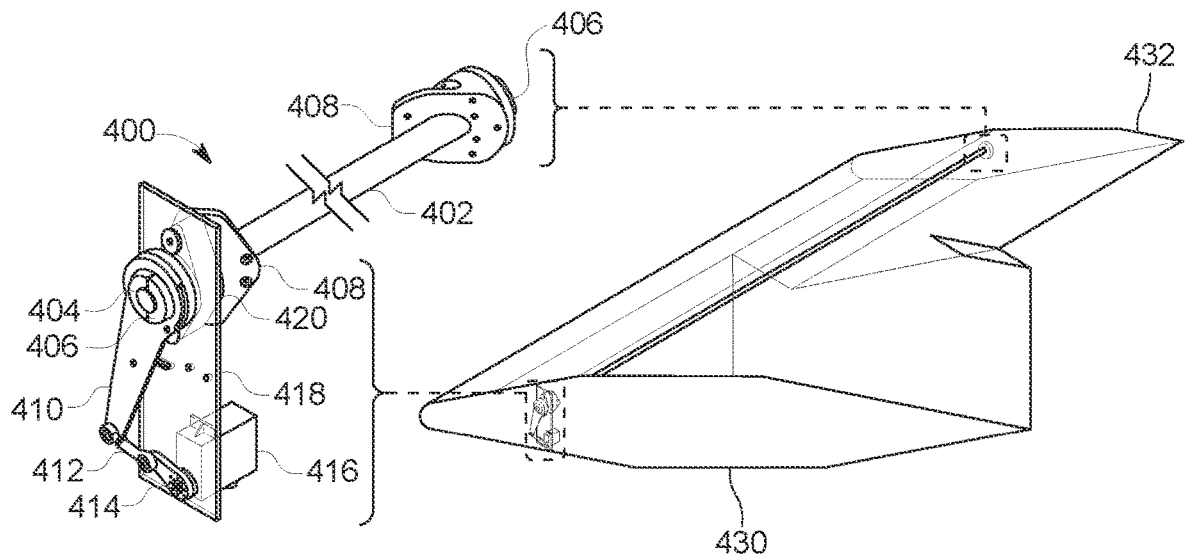
FIG. 7A shows a 31.75 mm OD, 25.4 mm ID carbon fiber tube that transfers torque to a wing tip.
Figure 7B:
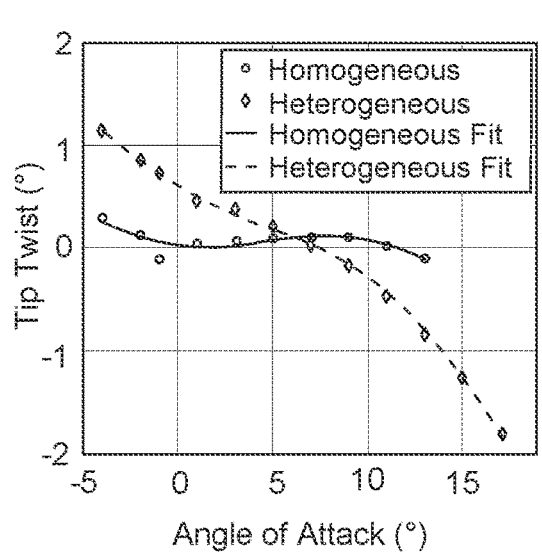
FIG. 7B is a graph of tip twist with the torque rod vs. angle of attack.

FIG. 7A shows the actuation mechanism 400 that drives the deformation. The programmed torsional flexibility of the heterogeneous model increased the twist range of the torque rod from +/−0.25° to +/−0.5°. FIG. 7B shows the amount of twist for the baseline homogeneous and programmed heterogeneous models over the full angle attack range with the torque rod engaged. As we would expect the baseline homogeneous model shows little variation from the torque rods commanded 0.25° of twist. The programmed heterogeneous model though maintains the designed lift enhancing tip twist profile presented in FIGS. 7A-7B, but with a persistent offset maintaining roll control authority. This indicates that quasi-static, passive stiffness tuning can still be implemented as an active shape morphing mechanism.

Figure 7C:
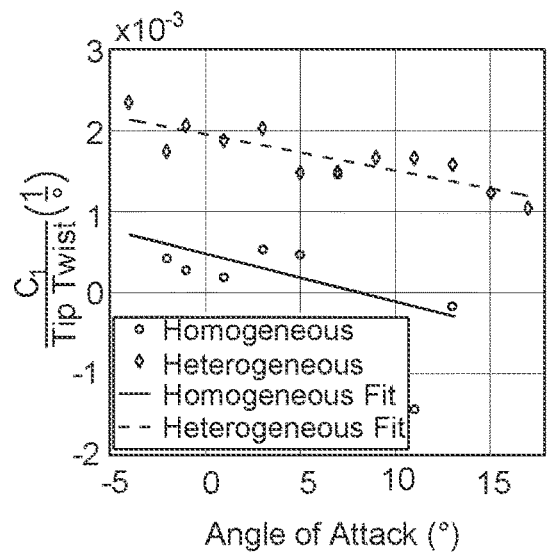
FIG. 7C is a graph of roll authority per tip twist degree vs. angle of attack.

The adaptation of the programmed aerostructure into an adaptive aeroelastic mechanism implements broad elastic structure coupling to a simple actuator, effectively providing a system-wide control gain increase. FIG. 7C shows a comparison of the amount of roll coefficient per amount of tip twist, between the baseline homogeneous and programmed heterogeneous experiments. The programmed heterogeneous model shows a consistent increase over the baseline homogeneous model for the full range of angle of attack with insignificant effects from the change in angle of attack. This steady increase means that the programmed structure is enhancing the control authority of the torque rod mechanism. We explain this as due to the combination of the twist and inboard camber stiffness alterations that allow for the application of the torque rod point load to translate into active shape morphing, which results in an increase in lift and roll for the actuated wing. The combined results of passive and active shape change show that the building block material system can effectively be used as an adaptive programmed elastic structure.

The details of FIG. 7A are: Actuation System and Results. A) A 31.75 mm OD, 25.4 mm ID carbon fiber tube 402 transfers torque to the wing tip 432 from the actuation source at the root 430. A 25.4 mm OD keyed aluminum shaft 404 is epoxied to the end of the tube, with 25.4 mm extending and clamped by a keyed shaft collar 406. At the tip 432, this shaft collar bolts to a milled aluminum fixture 408 which bolts to the carbon fiber tip plate 230 (not shown). At the root 430, the shaft collar 406 bolts to a 6 mm thick aluminum plate armature 410. This armature 410 connects to a ball-bearing linkage 412, which connects to a 6 mm thick aluminum servo horn armature 414. This bolts to a high torque servo 416, which is fixtured to a 6 mm aluminum mounting plate 418. This plate is bolted to a mounted bearing with flanges 420 which bolts to a milled aluminum fixture 408, which bolts to the root plate 220 on either side. FIG. 7B shows the tip twist of the aerostructure with the torque rod. The structural tuning allowed for a large amount of tip twist over the range of angles of attack even with the addition of a span-wise stiffening component. The effect of the increase in flexibility can be seen in FIG. 7C where the roll authority per tip twist degree was increased for the baseline homogeneous model.

Aerostructure Density

The significant potential benefit of cellular lattice structures is high stiffness at ultralight densities. Reduction in weight for transportation and locomotion applications can reduce power requirements, increase fuel efficiency, and decrease costs [32]. The resulting system density, including the substructure, interface, and skin building blocks, is well below 10 mg/cm3 (the threshold for classification as ultralight material). The complete actuated system still displays an overall mass density of 12.7 mg/cm3, below the other provided reference densities.

Manufacturability

To assess the potential of discrete lattice assembly as a manufacturing approach, we consider it in comparison to existing technologies for additive manufacture of lattice materials [18], specifically looking at throughput.

A single half span wing from this work, containing 2088 substructure building blocks 100, took approximately 175 person-hours to construct or about 5 minutes per building block 100. The manual addition of a single octahedral building block 100 to a structure is associated with 3 bolted connections, or 1-2 minutes per connection (time to pick up, place, and tighten the fastening hardware). Common additive manufacturing methods such as selective laser melting (SLM) and polyjet printing display build rate governed by the bounding box of the object, with volumetric throughput ranging from 10-200 (cm$^3$/hr). By comparison, our method assembled a bounding volume of roughly 1 cubic meter at a bounding volumetric throughput of about 5000 (cm$^3$/hr).

Comparison to 3D printing, automated carbon fiber layup [39] filament winding [40], or anisogrid fabrication [41], shows that automation is extremely important. Development of automated robotic assembly of discrete lattice material systems is in its infancy, on relatively small (<1 m) scale structures, but has already demonstrated a rate of 40 seconds per building block [42], or nearly 40,000 (cm³/hr), as shown in Table 1. We see that even mass throughput is on par with current low-cost 3D printers. Volumetric throughput is an order of magnitude greater than current methods, which is a result of the scalability of this manufacturing process using centimeter scale parts to create meter scale structures.

TABLE 1

Comparison of manufacturing methods for high performance lattice structures.

| Manufacturing Method | Volume Rate (~) | Mass Rate (~) | Scalec |
|---|---|---|---|
| Selective Laser Melting (SLM) [43] | <170 | <195 | <1 |
| Fused Deposition Modeling (FDM) [44] | <60 | <65 | >1 |
| Polyjet (photopolymer) [45] | <80 | <95 | <1 |
| Discrete lattice material manual assembly (this work) | ~5000 | ~27 | >1 |
| Discrete lattice material robotic assembly [42] | ~39821 | ~220 | <1 |

4.3. Design Considerations

While the modulus of the presented lattice structure is elastomeric with a much lower density than elastomers, with near ideal specific strength performance [21], this is expected to display failure strains that are more typical of conventional aerospace materials with similar specific stiffness. Some applications employ elastomers for their hyperelastic characteristics with an elastic strain of 100%-500% [46] whereas the presented fiber reinforced polymer lattice structure elongation at failure is at an elastic strain of 1.2%[21]. The present invention takes an approach where we were selectively embedding a softer material in a harder materials to meet experimental safety factors. Using the same methodology with higher performance secondary materials might eventually be used to enhance the elastic strain further, while still displaying ultralight properties.

The mechanical behavior of each lattice unit cell is governed by the parameters that govern all cellular solid materials: the relative density, constituent material, and geometry [31]. This means that during the design process the constituent material selection is still a necessary and familiar process. Lastly, the size of the building blocks (and associated resolution when applied) must reflect the geometric characteristics of the expected boundary conditions. For our application, the unit cell is sized to allow manual assembly while also maintaining the desired design flexibility, and ability to support a relatively lightweight skin system, given the spatial variability of expected aerodynamic loading.

The ability to rapidly design and fabricate ultralight actuated systems can enable novel applications in the converging fields of transportation and robotics, where the traditionally orthogonal objectives of design flexibility and manufacturability can be aligned. The converging fields may be addressed by our building block based material system, which is targeted towards mass-critical robotic and aerospace applications.

We have shown that it is possible to program our substructure to augment actuation, with the aim of increasing control efficiency, decreasing required actuated inertia, and allowing for increased range, payload, and cost efficiency. Our current approach employs simple servomotors and torque tubes, but the manufacturing strategy may lend itself to case of implementation of distributed actuation [47]. Similarly, the modularity of the structure provides a potential opportunity for simple integration of a distributed sensing and computation system [48, 49]. The design of these systems can be enhanced from our iterative design approach to include topological optimization like that presented in [50], but due to its modular nature, the substructure is already subdivided, and relatively efficient discrete optimization can be performed on the building block material or relative density.

Lastly, one of the most mass-sensitive applications is robotic exoplanet exploration. Currently, it costs roughly 10,000 USD to launch 1 kg of material to lower earth orbit [51], with ambitious ongoing efforts to reduce this by a factor of two. The cost will remain high enough that mass-efficient and robust hardware technology may continue to be the most significant driver in expanding our exploration capabilities. Modular, ultralight cellular structures can potentially enable new frontiers in aviation, transportation, and space exploration.

Appendices

Appendix A. Data Processing

The motion capture (Vicon) data was collected with respect to an arbitrary center point just of the left wing tip. The model is in the global rotation reference frame of the tunnel and the two need to be matched to be able to compare between baseline homogeneous and tuned heterogeneous models which were calibrated separately and have different reference points. For each angle of attack set point the average of all the data take at that set-point for each individual retro-reflective identifier. A known set of tip identifiers are then use to generate rotation matrices. The tip set is first fit to lines in the y-z and x-y plane and the end points of each fit lines are used to calculate the distance between the leading edge and trailing edge identifiers of the set, $d_x$, $d_y$, $d_z$ for the x distance, y distance, and z distance respectively. The rotation matrix about the z axis between the tunnel reference plane and the motion capture system is:

$$R_z = \begin{bmatrix} \frac{d_y}{V_z} & -\frac{d_x}{V_z} & 0 \\ \frac{d_x}{V_z} & \frac{d_y}{V_z} & \\ 0 & 0 & 1 \end{bmatrix} \quad (A.1)$$

$$\text{where, } V_z = \sqrt[2]{d_y^2 + d_x^2} \quad (A.2)$$

The distances $d_x$, $d_y$, $d_z$ are then rotated into the Z axis global model frame so that the rotated points are $$P = R_z \begin{bmatrix} d_x \\ d_y \\ d_z \end{bmatrix} \quad (A.3)$$

The rotated points P can then be used to find the x rotation matrix $$R_x = \begin{bmatrix} 1 & 0 & 0 \\ 0 & C_\theta & -S_\theta \\ 0 & S_\theta & C_\theta \end{bmatrix} \quad (A.4)$$

where θ is the angle of rotation about the global model x-axis and $$C_\theta = \frac{opp^2}{-2 * d_L^2} + 1 \quad (A.5)$$

$$S_\theta = \sqrt[root]{1 - C_\theta^2} \quad (A.6)$$

where, $d_L = \sqrt[2]{d_x^2 + d_y^2 + d_z^2}$ and (A.7)

$$opp = \sqrt[2]{(d_L cos(\theta) - P_x)^2 + (d_L sin(\theta) - P_z)^2} \quad (A.8)$$

The roll rotation matrix can then be found using the roll angle from the wind tunnel QFLEX system.

$$R_y = \begin{bmatrix} cos(\phi) & 0 & sin(\phi) \\ 0 & 1 & 0 \\ -sin(\phi) & 0 & cos(\phi) \end{bmatrix} \quad (A.9)$$

The difference between the known positions of the tip identifier and the balance is the tuple $d_B$. The vicon data in the global reference, $V_{rot}$ is then $$V_{rot} = R_y R_x R_z (V + d_b) \quad (A.10)$$

In order to compare between each different angles of attack the wings need to be adjusted so that the balance is in the same relative location. To do that the height of the center of rotation $CR_h$ needs to be determined by $$CR_h = B_h - T_x sin(\alpha) - H_{ref} cos(\alpha) \quad (A.11)$$

where $B_h$ is the balance height, α is the angle of attack, T is the distance tuple between the balance and center of rotation and $H_{ref}$ is the reference height that all of the different set-points will be compared too. The adjusted vicon data $V_{adj}$ which is used for all the results in this paper can be determined by $$V_{adj} = R(\alpha) V_{rot} \begin{bmatrix} 0 \\ 0 \\ -CR_h \end{bmatrix} \quad (A.12)$$

where $R(\alpha) = \begin{bmatrix} 1 & 0 & 0 \\ 0 & cos(-\alpha) & -sin(-\alpha) \\ 0 & sin(-\alpha) & cos(-\alpha) \end{bmatrix}$ (A.13)

With the vicon data for each set-point shares the same reference plane the sectional twist and displacement can be calculated. We assume that the cross section of the wind does not deform much and stays in the same plane. As a result the coordinates of a reference point i, $P_{ref}^i$ is related to the deformed point $P_{def}^i$ by $$P_{def}^i = T_{CM}^{-1} T_{disp} T_{CM} R(\theta_{twist}) P_{ref}^i \quad (A.14)$$

where $T_{CM} = \begin{bmatrix} 1 & 0 & -CM_y \\ 0 & 1 & -CM_z \\ 0 & 0 & 1 \end{bmatrix}$ (A.15)

$$T = \begin{bmatrix} 1 & 0 & disp_y \\ 0 & 1 & disp_z \\ 0 & 0 & 1 \end{bmatrix} \quad (A.16)$$

$$R(\theta_{twist}) = \begin{bmatrix} cos(\theta_{twist}) & -sin(\theta_{twist}) & 0 \\ sin(\theta_{twist}) & cos(\theta_{twist}) & 0 \\ 0 & 0 & 1 \end{bmatrix} \quad (A.17)$$

Then the displacement ($disp_y$, $disp_z$) and rotation ($\theta_{twist}$) for that section is solved by minimizing the least squares error between the predicted $P_{def}$ of the sectional set and the actual vicon data $v_{adj}$. The sectional sets are determined by selecting all the points within a 6 inch span-wise section where retro-reflective identifiers are.

Appendix B. Building Block Parts

TABLE B1

Summary of building blocks used per half span

| Part type | Quantity | Material |
|---|---|---|
| Substructure | | |
| 1. Ultem 2000 (homogeneous wing) | 2088 | PEI, 20% chopped fiber |
| 1a. Ultem 2000 (heterogeneous wing) | 1741 | PEI, 20% chopped fiber |
| 2. Ultem 1000 (heterogeneous wing) | 347 | PEI |
| Interface | | |
| 3. Flat interface | 414 | RTP |
| 4. Slope interface | 963 | RTP |
| 4a. Slope straight spacer | 318 | RTP |
| 4b. Slope elbow spacer | 309 | RTP |
| 5. Leading edge | 35 | Delrin, 3D print |
| 6. Transition | 2 | Delrin, 3D print |
| 7. Plate mounting | 506 | RTP |
| Skin | | |
| 8. Skin (basic) | 248 | PEI |
| 8a. Skin (custom) | 54 | PEI |

REFERENCES

[1] Jun J W, Silverio M, LlubiaJ A, Markopoulou A, Dubor A et al. 2017
[2] Senatore G, Duffour P and Winslow P 2018 *Engineering Structures* 167 608-628
[3] Joshi S, Tidwell Z, Crossley W and Ramakrishnan S 2004 Comparison of morphing wing stategies based upon aircraft performance impacts 45*th AIAA/ASMEIASCE/AHS/ASC Structures, Structural Dynamics & Materials Conference* p 1722
[4] Barbarino S, Bilgen O, Ajaj R M, Friswell M I and Inman D J 2011 *Journal of intelligent material systems and structures* 22 823-877
[5] Weisshaar T A 2006 Morphing aircraft technology-new shapes for aircraft design Tech. rep. PURDUE UNIV LAFAYETTE I N
[6] Straub F K, Ngo H T, Anand V and Domzalski D B 2001 *Smart materials and structures* 10 25
[7] Monner H P 2001 *Aerospace Science and Technology* 5 445-455
[8] Vos R and Barrett R 2011 *Smart Materials and Structures* 20 094010
[9] Sanders B, Eastep F and Forster E 2003 *Journal of Aircraft* 40 94-99
[10] Kudva J N 2004 *Journal of intelligent material systems and structures* 15 261-267

[11] Wagg D, Bond I, Weaver P and Friswell M 2008 *Adaptive structures: engineering applications* (John Wiley & Sons)

[12] Yokozeki T, Takeda S i, Ogasawara T and Ishikawa T 2006 *Composites Part A: applied science and manufacturing* 37 1578-1586

[13] Kota S, Hetrick J A, Osborn R, Paul D, Pendleton E, Flick P and Tilmann C 2003 Design and application of compliant mechanisms for morphing aircraft structures *Smart Structures and Materials 2003: Industrial and Commercial Applications of Smart Structures Technologies* vol 5054 (International Society for Optics and Photonics) pp 24-34

[14] Chen Y, Yin W, Liu Y and Leng J 2011 *Smart Materials and Structures* 20 085033

[15] Majji M, Rediniotis O and Junkins J 2007 Design of a morphing wing: modeling and experiments *AIAA Atmospheric Flight Mechanics Conference and Exhibit* p 6310

[16] Neal D, Good M, Johnston C, Robertshaw H, Mason W and Inman D 2004 Design and wind-tunnel analysis of a fully adaptive aircraft configuration *45th AIAA/ASMEI-ASCE/AHS/ASC Structures, Structural Dynamics & Materials Conference* p 1727

[17] Cheung K C and Gershenfeld N 2013 *Science* 1240889

[18] Schaedler T A and Carter W B 2016 *Annual Review of Materials Research* 46 187-210

[19] Bertoldi K, Vitelli V, Christensen J and van Hecke M 2017 *Nature Reviews Materials* 2 17066

[20] Zheng X, Smith W, Jackson J, Moran B, Cui H, Chen D, Ye J, Fang N, Rodriguez N, Weisgraber T et al. 2016 *Nature materials* 15 1100

[21] Gregg C, Kim J and Cheung K 2018 *Advanced Engineering Materials*

[22] Jenett B, Calisch S, Cellucci D, Cramer N, Gershenfeld N, Swei S and Cheung K C 2017 *Soft robotics* 4 33-48

[23] Coulais C. Teomy E, de Reus K, Shokef Y and van Hecke M 2016 *Nature* 535 529

[24] Florijn B, Coulais C and van Hecke M 2014 *Physical review letters* 113 175503

[25] Frenzel T, Kadic M and Wegener M 2017 *Science* 358 1072-1074

[26] Gibson L J and Ashby M F 1999 *Cellular solids: structure and properties* (Cambridge university press)

[27] Liebeck R H 2004 *Journal of aircraft* 4110-25

[28] Voskuijl M, La Rocca G and Dircken F 2008 Controllability of blended wing body aircraft *Proceedings of the 26th International Congress of the Aronautical Sciences, ICAS 2008, including the 8th AIAA Aviation Technology, Integration and Operations (AIO) Conference*, Anchorage, Alaska, Sep. 14-19, 2008 (Optimage Ltd.)

[29] Paranjape A A, Chung S J and Selig M S 2011 *Bioinspiration & biomimetics* 6026005

[30] Cramer N, Kim J H, Gregg C, Jenett B, Cheung K and Swei S S M 2019 Modeling of tunable elastic ultralight aircraft (submitted) *AIAA Aviation Forum*

[31] Ashby M 2006 *Philosophical Transactions of the Royal Society of London A: Mathematical, Physical and Engineering Sciences* 364 15-30

[32] Von Karman T and Gabrielli G 1950 *Mechanical Engineering* 72 775-781

[33] Jones J 2017 *Development of a Very Flexible Testbed Aircraft for the Validation of Nonlinear Aeroelastic Codes* Ph.D. thesis University of Michigan

[34] Livne E, Precup N and Mor M 2014 Design, construction, and tests of an aeroelastic wind tunnel model of a variable camber continuous trailing edge flap (vcctef) concept wing *32nd AIAA Applied Aerodynamics Conference* p 2442

[35] Britt R. Ortega D, Mc Tigue J and Scott M 2012 Wind tunnel test of a very flexible aircraft wing *53rd AIAA/ASMEIASCE/AHS/ASC Structures, Structural Dynamics and Materials Conference 20th AIAA/ASMEIAHS Adaptive Structures Conference 14th AIAA* p 1464

[36] Dumont E R 2010 *Proceedings of the Royal Society of London B: Biological Sciences* rspb20100117

[37] Wood R J 2007 Liftoff of a 60 mg flapping-wing mav *Intelligent robots and systems, 2007. iros 2007. ieeeklj international conference on* (IEEE) pp 1889-1894

[38] Bai C, Mingqiang L, Zhong S, Zhe W, Yiming Mand Lei F 2014 *International Journal of Aeronautical and Space Sciences* 15 383-395

[39] August Z, Ostrander G, Michasiow J and Hauber D 2014 *SAMPE J* 50 30-37

[40] Vasiliev V, Krikanov A and Razin A 2003 *Composite structures* 62 449-459

[41] Vasiliev V V, Barynin V A and Razin A F 2012 *Composite structures* 94 1117-1127

[42] Trinh G, Copplestone G, O'Connor M, Hu S, Nowak S, Cheung K, Jenett Band Cellucci D 2017 Robotically assembled aerospace structures: Digital material assembly using a gantry-type assembler *Aerospace Conference, 2017 IEEE* (IEEE) pp 1-7

[43] Slm spec sheet https://slm-solutions.com/products/machines/selective-laser-mel ting-machine-slmr500 accessed: 2018-03-30

[44] Go J, Schiffres S N, Stevens A G and Hart A J 2017 *Additive Manufacturing* 16 1-11

[45] Brajlih T, Valentan B, Balic J and Drstvensek I 2011 *Rapid prototyping journal* 17 64-75

[46] Case J C, White E L and Kramer R K 2015 *Soft Robotics* 2 80-87

[47] Cramer N, Tebyani M, Stone K, Cellucci D, Cheung K C, Swei S and Teodorescu M 2017 Design and testing of fervor: Flexible and reconfigurable voxel-based robot *Intelligent Robots and Systems (IROS), 2017 IEEE/RS] International Conference on* (IEEE) pp 2730-2735

[48] Recht B and D'Andrea R 2004 *IEEE Transactions on Automatic Control* 49 1446-1452

[49] Espenschied K S, Quinn R D, Beer R D and Chiel H J 1996 *Robotics and autonomous systems* 18 59-64

[50] Aage N, Andreassen E, Lazarov B S and Sigmund O 2017 *Nature* 550 84-86

[51] Costs S T 2002 *Futron Corporation*

What is claimed is:

1. An elastic shape-morphing ultralight aerodynamic structure comprising:
   a substructure portion that includes a plurality of unit cells each having N nodes, where N is a positive integer, constructed to be connected together at said nodes to form a lattice structure;
   the substructure portion further comprising a plurality of interface parts constructed to interconnect the unit cells to form the lattice structure, and including at least one first interface part having a unique geometry relative to other interface parts,
   the at least one first interface part forming a part of the substructure portion,
   the at least one first interface part having a central portion, the central portion having two sections extending therefrom, wherein each of the two sections is a lasercut plastic section, wherein an end of each of the two sections terminate in 3D-printed interface parts that connect to one of said nodes of two different unit cells of the plurality of unit cells;

skin comprising a plurality of overlapped skin panels constructed to allow panels to slip over one-another during aeroelastic shape morphing;

wherein the lattice structure is interconnected with said interface parts to produce an aerodynamic shape, the aerodynamic shape being externally covered by the skin, and the two sections are shaped following a cross-section geometry of a leading edge of the aerodynamic shape;

wherein the aerodynamic structure includes at least one root part and one tip part, and further comprises a torque rod actuatable from the root part and connected at a single point at the tip part; and, wherein, the aerodynamic shape is constructed from the substructure portion, the interface parts and the skin to shape-morph under both external loading and actuation of the torque rod.

2. The elastic shape morphing ultralight structure of claim 1 wherein N=6 and the unit cells are octahedral.

3. The elastic shape morphing ultralight structure of claim 1 wherein the aerodynamic shape is a wing.

4. The elastic shape morphing ultralight structure of claim 2 wherein the substructure portion includes two types of octahedral unit cells each made from a different material.

5. The elastic shape morphing ultralight structure of claim 4, wherein the different materials are polyetherimide (PEI) with chopped glass fiber reinforcement and un-reinforced PEI.

6. The elastic shape morphing ultralight structure of claim 1 wherein the interface parts include flat parts that provide mounting points for the overlapped skin panels.

7. The elastic shape morphing ultralight structure of claim 6 wherein the interface parts also include slope parts made from one flat part and two spacing parts.

8. The elastic shape morphing ultralight structure of claim 3 wherein the wing includes wing sweep for pitch stability and dihedral for lateral stability.

9. The elastic shape morphing ultralight structure of claim 3 wherein the wing includes twist and camber.

10. The elastic shape morphing ultralight structure of claim 1 wherein the panels are approximately 165 mm square-shaped overlapping one-another by approximately 10 mm.

11. An elastic shape morphing ultralight wing structure comprising:

a substructure portion that includes a plurality of octahedral unit cells each having six nodes constructed to be connected together at said nodes to form a cubo-octahedral lattice structure, and wherein the substructure portion includes two types of octahedral unit cells each made from a different material;

the substructure portion further comprising a plurality of interface parts constructed to interconnect the octahedral unit cells to form the cubo-octahedral lattice structure, wherein the interface parts include flat parts that provide mounting points for the overlapped skin panels and slope parts made from one flat part and two spacing parts, and include at least one leading edge part, wherein the interface parts form a part of the substructure portion, and wherein the interface portion has a central portion, the central portion having two sections extending therefrom, wherein each of the two sections is a lasercut plastic section, wherein an end of each of the two sections terminate in 3D-printed interface parts that connect to one of said nodes of two different unit cells of the plurality of octahedral unit cells;

skin comprising a plurality of overlapped skin panels constructed to allow panels to slip over one-another during aeroelastic shape morphing;

wherein the cubo-octahedral lattice structure is interconnected with said interface parts to produce said wing, the wing being externally covered by the skin, and the at least one leading edge part following a geometry of a leading edge of the wing;

wherein the ultralight wing structure includes at least one root part and one tip part, and further comprises a torque rod actuatable from the root part and connected at a single point at the tip part; and wherein, the wing is constructed from the substructure portion, the interface parts and the skin to shape-morph under both external loading and actuation of the torque rod.

12. The elastic shape morphing ultralight structure of claim 11, wherein the different materials are polyetherimide (PEI) with chopped glass fiber reinforcement and un-reinforced PEI.

13. The elastic shape morphing ultralight structure of claim 11 wherein the wing includes wing sweep for pitch stability and dihedral for lateral stability.

14. The elastic shape morphing ultralight structure of claim 11 wherein the wing includes twist and camber.

15. The elastic shape morphing ultralight structure of claim 11 wherein the panels are approximately 165 mm square-shaped overlapping one-another by approximately 10 mm.

16. An aerodynamic shape-morphing structure built from a substructure portion that includes a plurality of octahedral unit cells interconnected with a plurality of interface parts, including at least one leading edge part having a unique geometry relative to others of the plurality of interface parts, the plurality of interface parts forming a part of the substructure portion, and the at least one leading edge part of the plurality of interface parts having a central portion, the central portion having two sections extending therefrom, wherein each of the two sections is a lasercut plastic section, wherein an end of each of the two sections terminate in 3D-printed interface parts that connect to one of a plurality of nodes of two different unit cells of the plurality of octahedral unit cells;

wherein the aerodynamic shape-morphing structure includes at least one root part and one tip part, and further comprises a torque rod actuatable from the root part and connected at a single point at the tip part; the aerodynamic shape-morphing structure being constructed change shape at both different aerodynamic loadings and actuation of the torque rod to enhance efficiency at particular and predetermined aerodynamic loadings.

17. The aerodynamic shape-morphing structure of claim 16 wherein the structure is a wing.

18. The aerodynamic shape-morphing structure of claim 17 wherein the particular, predetermined aerodynamic loadings occur at particular angles of attack of said wing.

19. The aerodynamic shape-morphing structure of claim 17 wherein said change of shape includes wing tip twist.

20. The aerodynamic shape-morphing structure of claim 19 wherein said wing tip twist changes with angle of attack.

* * * * *